US012717813B1

(12) United States Patent
Tenbuuren et al.

(10) Patent No.: US 12,717,813 B1
(45) Date of Patent: Aug. 25, 2026

(54) SYSTEMS AND METHODS FOR MODIFYING NETWORK DATA RECORDS USING MULTIPLE DEVICES

(71) Applicant: DK Crown Holdings Inc., Boston, MA (US)

(72) Inventors: Aaron Tenbuuren, Jamaica Plain, MA (US); Sam MacGinty, Boston, MA (US); Curtis Gerrard Lush, Etobicoke (CA); Brian Arthur Oddo, Somers, CT (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/329,079

(22) Filed: Sep. 15, 2025

(51) Int. Cl.
*G06F 16/27* (2019.01)
*G06F 9/451* (2018.01)
*G06F 16/28* (2019.01)
*G06F 21/62* (2013.01)

(52) U.S. Cl.
CPC .............. *G06F 16/27* (2019.01); *G06F 9/451* (2018.02); *G06F 16/285* (2019.01); *G06F 21/6218* (2013.01)

(58) Field of Classification Search
CPC ........ G06F 16/27; G06F 16/285; G06F 9/451; G06F 21/6218
See application file for complete search history.

(56) References Cited

U.S. PATENT DOCUMENTS

| | | | | |
|---|---|---|---|---|
| 9,846,716 | B1 * | 12/2017 | Scott | G06F 16/955 |
| 11,556,532 | B2 * | 1/2023 | Bohnsack | G06F 16/2246 |
| 12,488,137 | B1 * | 12/2025 | Gassner | G06F 21/6209 |
| 2021/0081365 | A1 * | 3/2021 | Conley | G06F 16/1873 |
| 2021/0303592 | A1 * | 9/2021 | Killian | G06F 16/275 |
| 2022/0391369 | A1 * | 12/2022 | Müller Graf | G06F 16/24553 |
| 2023/0029916 | A1 * | 2/2023 | Arora | G06F 16/24552 |
| 2024/0338462 | A1 * | 10/2024 | Maddox | G06F 16/2443 |
| 2025/0131000 | A1 * | 4/2025 | Seth | G06F 16/24575 |
| 2025/0274508 | A1 * | 8/2025 | Mendell | G06Q 10/40 |

* cited by examiner

*Primary Examiner* — Huawen A Peng
(74) *Attorney, Agent, or Firm* — Foley & Lardner LLP

(57) ABSTRACT

Systems and methods for real-time multi-user collaborative management of shared bet slips are disclosed. A system includes one or more processors coupled to non-transitory memory and configured to receive, from a first client device, a request to initiate a shared network data record identifying a second client device. The system provides, for presentation at each client device, a respective application interface for generation of the shared network data record, synchronizes a selection of a data structure identified in a communication from the first client device between the interfaces, receives confirmation requests from both client devices, and generates, responsive to receiving the confirmations, the shared network data record according to the selection. The shared network data record can be associated with a first profile of the first client device and a second profile of the second client device.

20 Claims, 15 Drawing Sheets

SYSTEMS AND METHODS FOR MODIFYING NETWORK DATA RECORDS USING MULTIPLE DEVICES

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

At least one aspect relates to a system. The system can include one or more processors coupled to non-transitory memory. The system is configured to receive, from a first client device, a request to initiate a shared network data record, the request identifying a second client device. The system can provide, for presentation at each of the first client device and the second client device, a respective application interface for generation of the shared network data record. The system can synchronize a selection of a data structure identified in a communication from the first client device between the respective application interface presented at the first client device and the second client device. The system can receive a respective request indicating confirmation from each of the first client device and the second client device. The system can generate, responsive to receiving the respective request indicating confirmation from each of the first client device and the second client device, the shared network data record according to the selection, the shared network data record associated with a first profile of the first client device and a second profile of the second client device.

In some implementations, the system can receive a configuration setting for the shared network data record in the request to initiate the shared network data record. In some implementations, the system can determine that the selection satisfies at least one restriction identified in the configuration setting. In some implementations, the at least one restriction specifies a range of values for a parameter of the shared network data record. In some implementations, the configuration setting specifies at least one category for one or more data structures to be included in the shared network data record. In some implementations, the at least one restriction specifies a threshold number of data structures to be included in the shared network data record.

In some implementations, the system can receive a first data record parameter for the shared network data record from the first client device. In some implementations, the system can receive a second data record parameter for the shared network data record from the second client device. In some implementations, the system can generate the shared network data record such that an association with the first profile identifies the first data record parameter and an association with the second profile identifies the second data record parameter. In some implementations, the system can cause presentation of the respective application interface as an overlay for a graphical user interface of an application executing on the first client device and the second client device. In some implementations, the system can provide, in response to the request to initiate the shared network data record, a notification to the second client device identifying the request to initiate the shared network data record.

In some implementations, the one or more processors are further configured to receive, from the second client device, a confirmation message to initiate the shared network data record. In some implementations, the one or more processors are further configured to provide the respective application interface for generation of the shared network data record to the second client device in response to the confirmation message. In some implementations, the one or more processors are further configured to receive, from the first client device, a request to restrict the second client device from accessing the shared network data record. In some implementations, the one or more processors are further configured to update the shared network data record to remove a permission corresponding to the second client device. In some implementations, the one or more processors are further configured to cause presentation of a plurality of data structures selected for inclusion in the shared network data record via the respective application interface presented at the first client device and the second client device.

At least one aspect is related to a method. The method can be performed, for example, by one or more processors coupled to non-transitory memory. The method can include receiving, from a first client device, a request to initiate a shared network data record, the request identifying a second client device. The method can include providing, for presentation at each of the first client device and the second client device, a respective application interface for generation of the shared network data record. The method can include synchronizing a selection of a data structure identified in a communication from the first client device between the respective application interface presented at the first client device and the second client device. The method can include receiving a respective request indicating confirmation from each of the first client device and the second client device. The method can include generating, responsive to receiving the respective request indicating confirmation from each of the first client device and the second client device, the shared network data record according to the selection, the shared network data record associated with a first profile of the first client device and a second profile of the second client device.

In some implementations, the method can include receiving a configuration setting for the shared network data record in the request to initiate the shared network data record. In some implementations, the method can include determining that the selection satisfies at least one restriction identified in the configuration setting. In some implementations, the at least one restriction specifies a range of values for a parameter of the shared network data record. In some implementations, the configuration setting specifies at least one category for one or more data structures to be included in the shared network data record. In some implementations, the at least one restriction specifies a threshold number of data structures to be included in the shared network data record. In some implementations, the method can include receiving a first data record parameter for the shared network data record from the first client device.

In some implementations, the method can include receiving a second data record parameter for the shared network data record from the second client device. In some implementations, the method can include generating the shared network data record such that an association with the first profile identifies the first data record parameter and an association with the second profile identifies the second data record parameter. In some implementations, the method can include causing presentation of the respective application interface as an overlay for a graphical user interface of an application executing on the first client device and the second client device. In some implementations, the method can include providing, in response to the request to initiate the shared network data record, a notification to the second client device identifying the request to initiate the shared network data record.

In some implementations, the method can include receiving, from the second client device, a confirmation message to initiate the shared network data record. In some implementations, the method can include providing the respective application interface for generation of the shared network data record to the second client device in response to the confirmation message. In some implementations, the method can include receiving, from the first client device, a request to restrict the second client device from accessing the shared network data record. In some implementations, the method can include updating the shared network data record to remove a permission corresponding to the second client device. In some implementations, the method can include causing presentation of a plurality of data structures selected for inclusion in the shared network data record via the respective application interface presented at the first client device and the second client device.

At least one aspect relates to a system. The system can include one or more processors coupled to non-transitory memory. The system can provide, for presentation at each of a first client device and a second client device, a respective application interface for generation of a shared network data record. The system can receive a first selection of a first data structure for the shared network data record from the first client device. The system can receive a second selection of a second data structure for the shared network data record from the second client device. The system can synchronize the first selection and the second selection between the respective application interface presented at the first client device and the second client device. The system can receive a lock message for the shared network data record from the first client device. The system can determine that the first client device has provided a first confirmation corresponding to the first selection and the second client device has provided a second confirmation of the second selection. The system can generate, responsive to the first confirmation and the second confirmation, and based on the lock message, an association between the shared network data record and a network profile of the first client device according to the first selection of the first data structure and the second selection of the second data structure.

In some implementations, the system can provide an indication of the first confirmation of the first selection and the second selection for presentation in the respective application interface of the second client device. In some implementations, the system can provide, to the second client device, a notification indicating the first client device has provided the lock message for the shared network data record. In some implementations, the system can receive, from the second client device, a third selection of a third data structure. In some implementations, the system can generate the shared network data record further based on the third selection of the third data structure. In some implementations, the system can provide, to the first client device, based on the first client device providing the lock message, a notification indicating that the first confirmation and the second confirmation for the shared network data record.

In some implementations, the system can receive, from the first client device, a third confirmation of the shared network data record, and the association is generated in response to the third confirmation. In some implementations, the system can provide, to the first client device, a first indicator for presentation with the shared network data record via the respective application interface. In some implementations, the system can receive, from the first client device, the lock message in response to an interaction with the first indicator. In some implementations, the system can cause the respective application interface to be presented at an application executing on the first client device and the second client device. In some implementations, the system can determine that the first data structure satisfies at least one restriction associated with the shared network data record.

In some implementations, the system can update the shared network data record to include the first data structure based on the first data structure satisfying the at least one restriction. In some implementations, the at least one restriction comprises at least one of a range of values for a parameter of the shared network data record, at least one category for one or more data structures to be included in the shared network data record, or a threshold number of data structures to be included in the shared network data record. In some implementations, the system can receive, from the first client device, a request to initiate the shared network data record, the request identifying a second client device. In some implementations, the system can provide, for presentation at each of the first client device and the second client device, the respective application interface for generation of the shared network data record in response to the request.

At least one other aspect relates to a method. The method can be performed, for example, by one or more processors coupled to non-transitory memory. The method can include providing, for presentation at each of a first client device and a second client device, a respective application interface for generation of a shared network data record. The method can include receiving a first selection of a first data structure for the shared network data record from the first client device. The method can include receiving a second selection of a second data structure for the shared network data record from the second client device. The method can include synchronizing the first selection and the second selection between the respective application interface presented at the first client device and the second client device. The method can include receiving a lock message for the shared network data record from the first client device. The method can include determining that the first client device has provided a first confirmation corresponding to the first selection and the second client device has provided a second confirmation of the second selection. The method can include generating, responsive to the first confirmation and the second confirmation, and based on the lock message, an association between the shared network data record and a network profile of the first client device according to the first selection of the first data structure and the second selection of the second data structure.

In some implementations, the method can include providing an indication of the first confirmation of the first selection and the second selection for presentation in the respective application interface of the second client device. In some implementations, the method can include providing, to the second client device, a notification indicating the first client device has provided the lock message for the shared network data record. In some implementations, the method can include receiving, from the second client device, a third selection of a third data structure. In some implementations, the method can include generating the shared network data record further based on the third selection of the third data structure. In some implementations, the method can include providing, to the first client device, based on the first client device providing the lock message, a notification indicating that the first confirmation and the second confirmation for the shared network data record.

In some implementations, the method can include receiving, from the first client device, a third confirmation of the shared network data record, and the association is generated in response to the third confirmation. In some implementations, the method can include providing, to the first client device, a first indicator for presentation with the shared network data record via the respective application interface. In some implementations, the method can include receiving, from the first client device, the lock message in response to an interaction with the first indicator. In some implementations, the method can include causing the respective application interface to be presented at an application executing on the first client device and the second client device. In some implementations, the method can include determining that the first data structure satisfies at least one restriction associated with the shared network data record.

In some implementations, the method can include updating the shared network data record to include the first data structure based on the first data structure satisfying the at least one restriction. In some implementations, the at least one restriction comprises at least one of a range of values for a parameter of the shared network data record, at least one category for one or more data structures to be included in the shared network data record, or a threshold number of data structures to be included in the shared network data record. In some implementations, the method can include receiving, from the first client device, a request to initiate the shared network data record, the request identifying a second client device. In some implementations, the method can include providing, for presentation at each of the first client device and the second client device, the respective application interface for generation of the shared network data record in response to the request.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
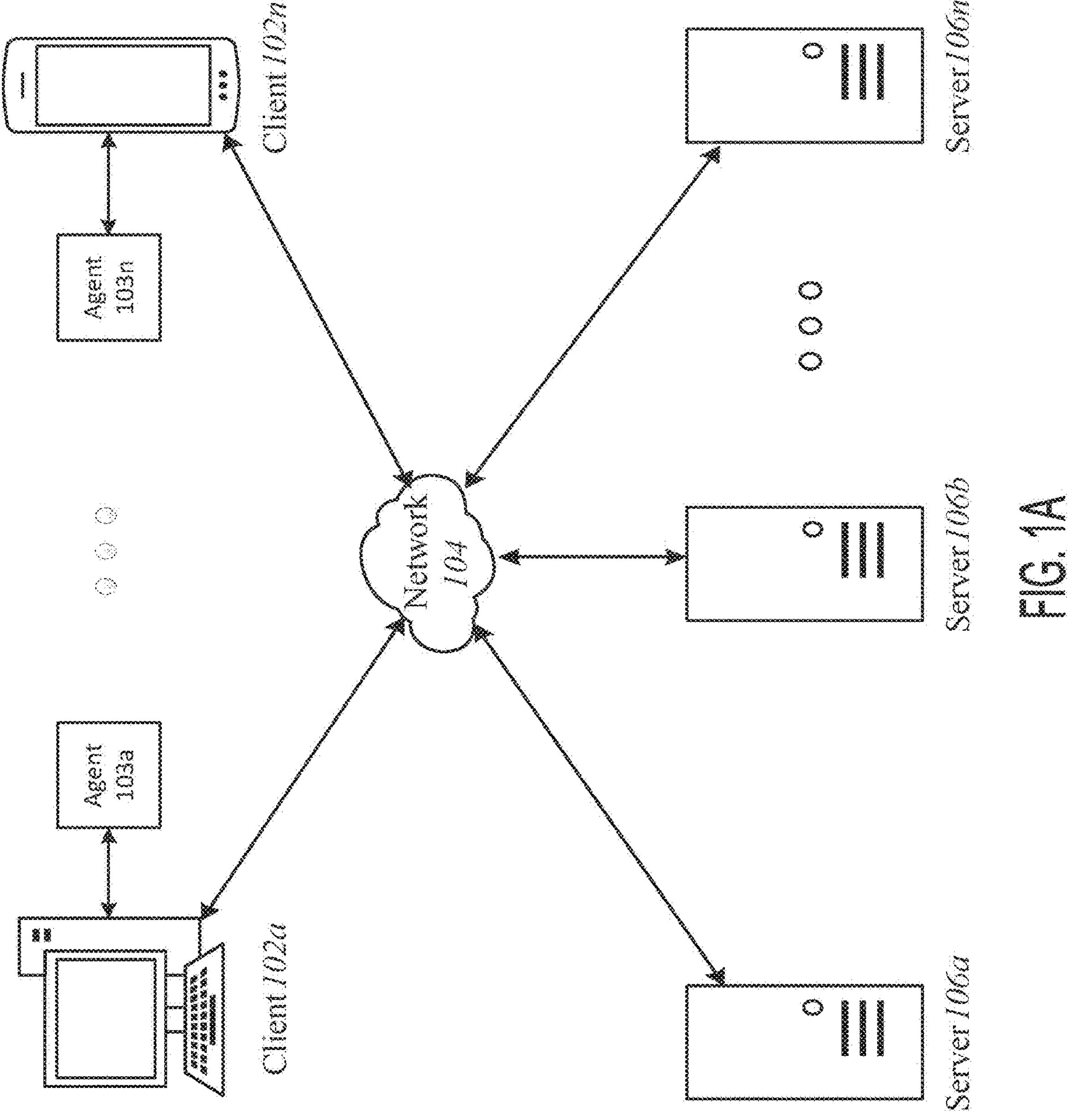
FIG. 1A is a block diagram depicting an embodiment of a network environment comprising a client device in communication with a server device.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

This disclosure relates to techniques for modification of data records in networked computing environments. Distributed computing platforms can provide client devices with interfaces for constructing and modifying shared data records, where a data record can include one or more data elements contributed by multiple endpoints. In some implementations, client devices can execute applications that permit selection of data elements, configuration of record parameters, and submission of update requests to a remote processing node. Networked architectures may include multiple client devices (e.g., endpoints) that may attempt to modify a common data record, including single-endpoint and multi-endpoint sessions that aggregate multiple data elements into a single data structure or single set of data structures. In some implementations, distributed networking environments can enable concurrent modification and management of shared data records by multiple endpoints.

Conventional approaches for collaborative data record management can present a number of technical challenges. Existing systems can lack support for real-time synchronization of shared data records across multiple client devices. In many cases, endpoints are unable to jointly add, remove, or lock data elements in a shared record while maintaining independent control over individual contributions. Systems can also be limited in providing reliable admission and reentry to collaborative sessions, such that endpoints experiencing transient disconnections may lose access or require repeated manual approval to rejoin. Additional challenges can arise in maintaining consistent state across endpoints during network interruptions, providing clear attribution for each endpoint contribution, and enforcing permissions and/or guardrails to prevent unauthorized modifications.

The techniques described herein can address the foregoing challenges by providing a framework for real-time, multi-endpoint collaboration on shared data records with server-side state management. The techniques described herein can permit multiple endpoints to participate in a shared session, where each endpoint can add, view, and manage data elements in a common data structure. The techniques described herein can provide server-hosted data records that reflect interactions across client devices, such that each endpoint receives real-time updates indicating the current state of the shared data record. The techniques described herein can implement both link-based and proximity-based session admission and can issue session tokens to facilitate automatic reentry after transient disconnects. Role-based permissions, per-element and per-session lock controls, and user interfaces that indicate attribution for corresponding interactions can be provided.

To implement these techniques, a system can maintain a shared data record that represents the current state of the collaborative session for a set of client devices. The system can receive update requests from client devices, such as requests to add or remove data elements, lock selections, or modify configuration parameters. The system can propagate state changes to all participating endpoints using real-time or near real-time communication protocols, such as WebSocket connections. The system can enforce permissions based on session metadata, including administrator/owner identifiers, limits on per-endpoint contributions, and parameter thresholds. Client devices can present user interfaces/application interfaces that indicate per-element/interaction attribution, lock status, and/or parameter changes, and can implement actions such as forking a shared record into a personal record and/or managing multiple concurrent shared sessions.

The techniques described herein can provide technical improvements over prior approaches by enabling reliable, real-time synchronization of shared data records across multiple endpoints. The server-side state model can support consistent state management and can provide catchup capabilities for endpoints that rejoin after a disconnect. The dual admission and token-based reentry models can reduce friction in session admission and continuity. The enforcement of permissions and compliance controls can mitigate automated and/or unauthorized modifications. User interfaces that indicate attribution and lock status, which can synchronized in a similar manner among endpoints. As a result, the techniques described herein can address the limitations of existing systems and provide significant improvements in performance, security, and throughput (e.g., via reductions in latency and synchronization time) for collaborative modification of distributed data records in networked computing environments.

Systems and methods described herein can synchronize shared network data records across multiple client devices and can reduce computing resource utilization by maintaining a server-side shared network data record and propagating only incremental updates, such as selections or confirmations, among participating client devices. The present techniques can synchronize selections in real-time or near real-time, such that each client device can avoid redundant processing or storage of the entire session state. Such approaches can reduce local computation and memory allocation on individual client devices relative to conventional approaches, resulting in improved resource utilization while maintaining consistent collaborative session state across all participants.

In some implementations, the present techniques can reduce network communication overhead or latency by limiting message traffic to updates that reflect actual changes in the shared network data record, such as synchronizing one or more selections of a data structure identified in a communication from a first client device between the respective application interfaces presented at the first client device and a second client device, rather than transmitting the entire data record with each update. Systems and methods described herein can generate and transmit responses only in response to specific requests or state changes, which can minimize the volume or frequency of data transmitted over the network. Network bandwidth consumption can thereby be reduced, providing a technical improvement relative to conventional approaches.

Referring to FIG. 1A, an embodiment of a network environment is depicted for managing network sessions of network applications. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
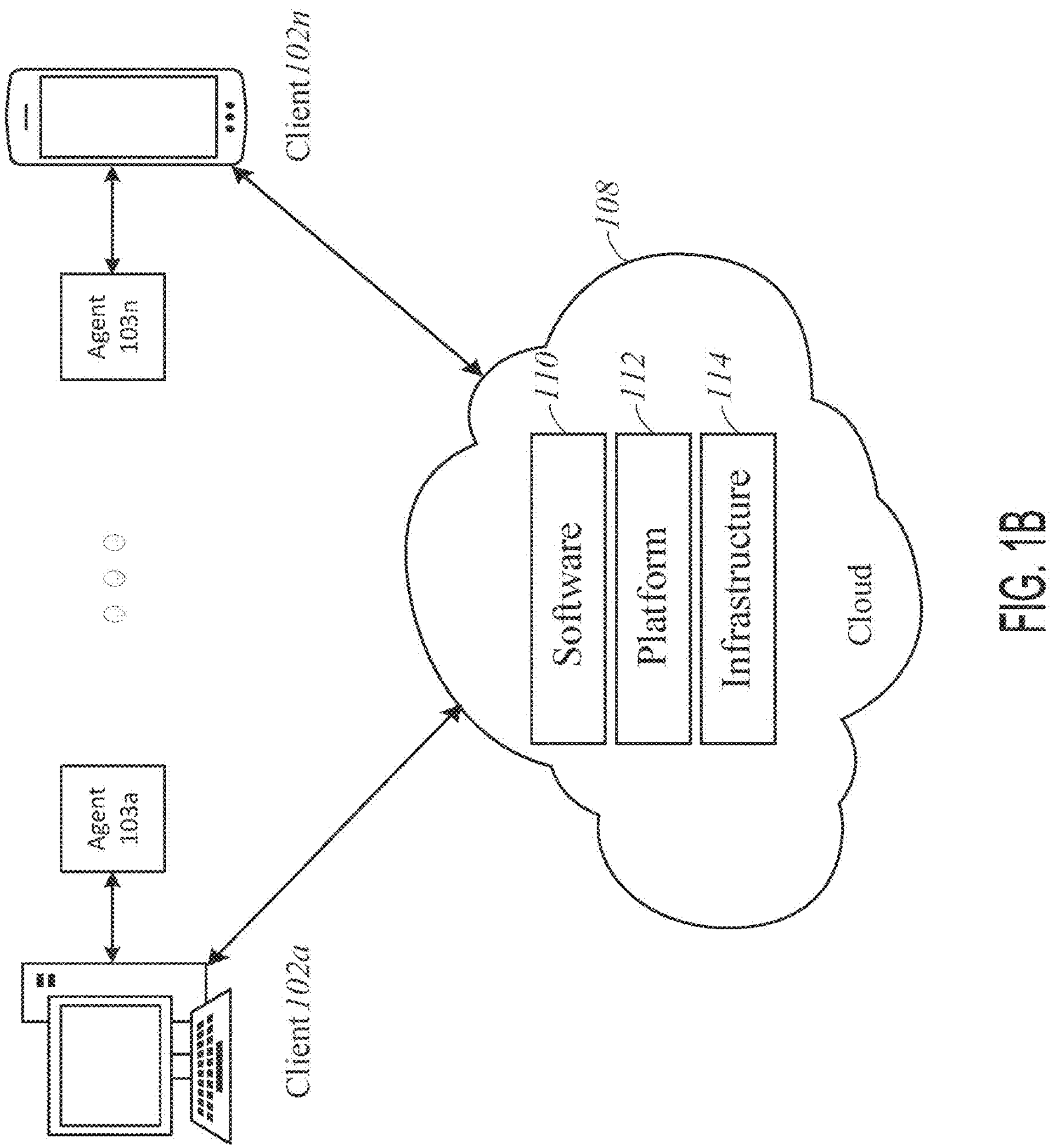
FIG. 1B is a block diagram depicting a cloud computing environment comprising a client device in communication with cloud service providers.

Referring to FIG. 1B, a cloud computing environment is depicted for managing network sessions of network applications. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
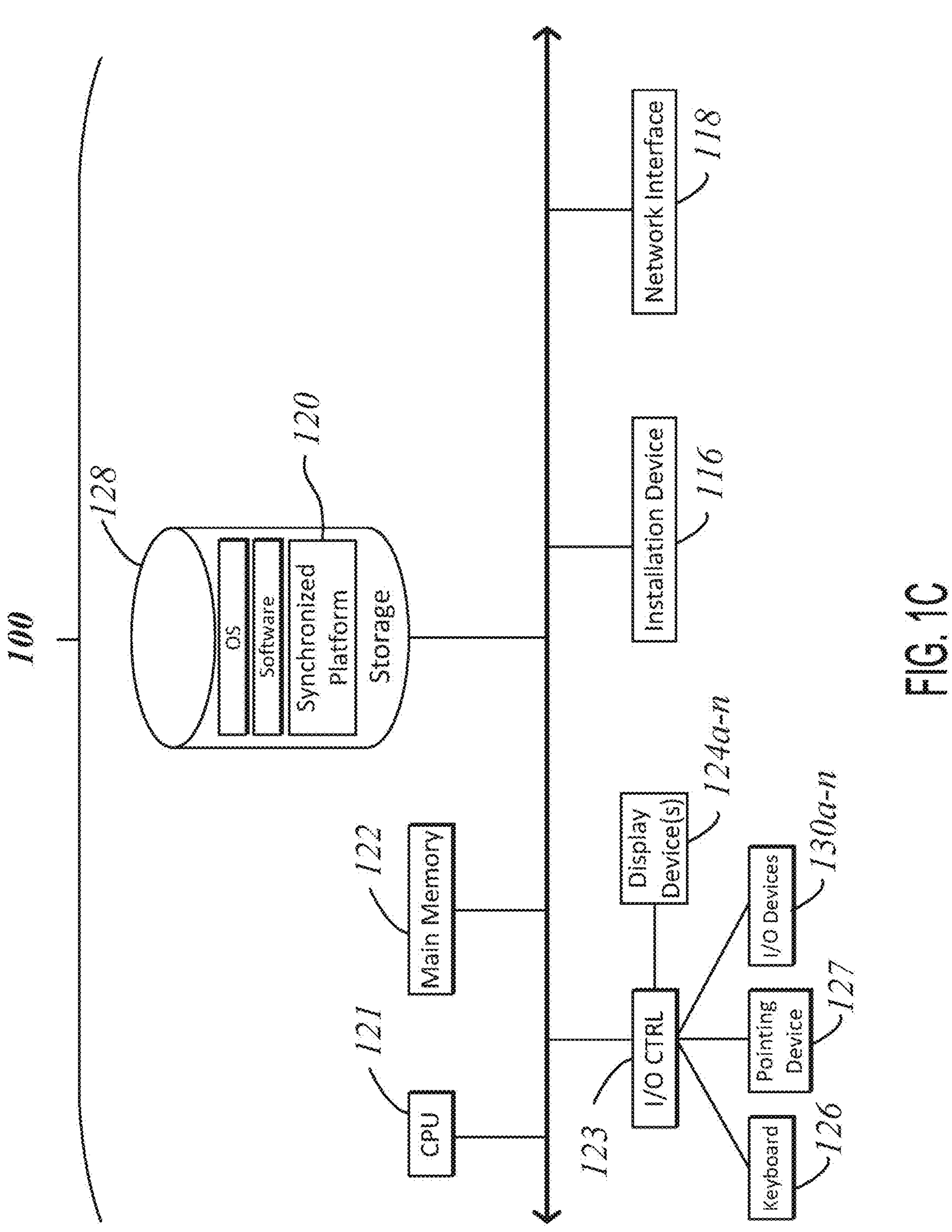
FIGS. 1C and 1D are block diagrams depicting embodiments of computing devices useful in connection with the methods and systems described herein.
Figure 1D:
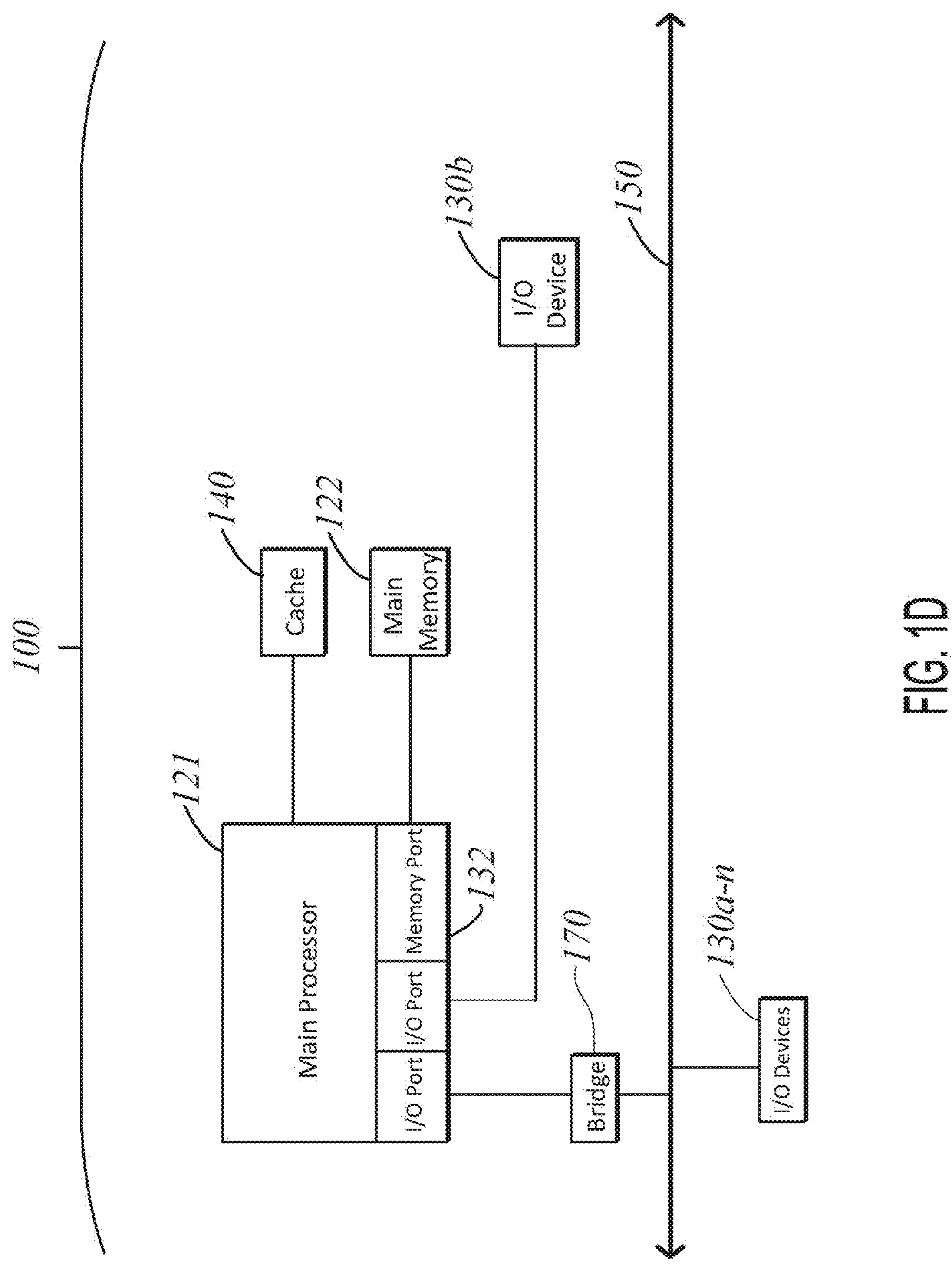

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for managing network sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a Fire Wire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 2:
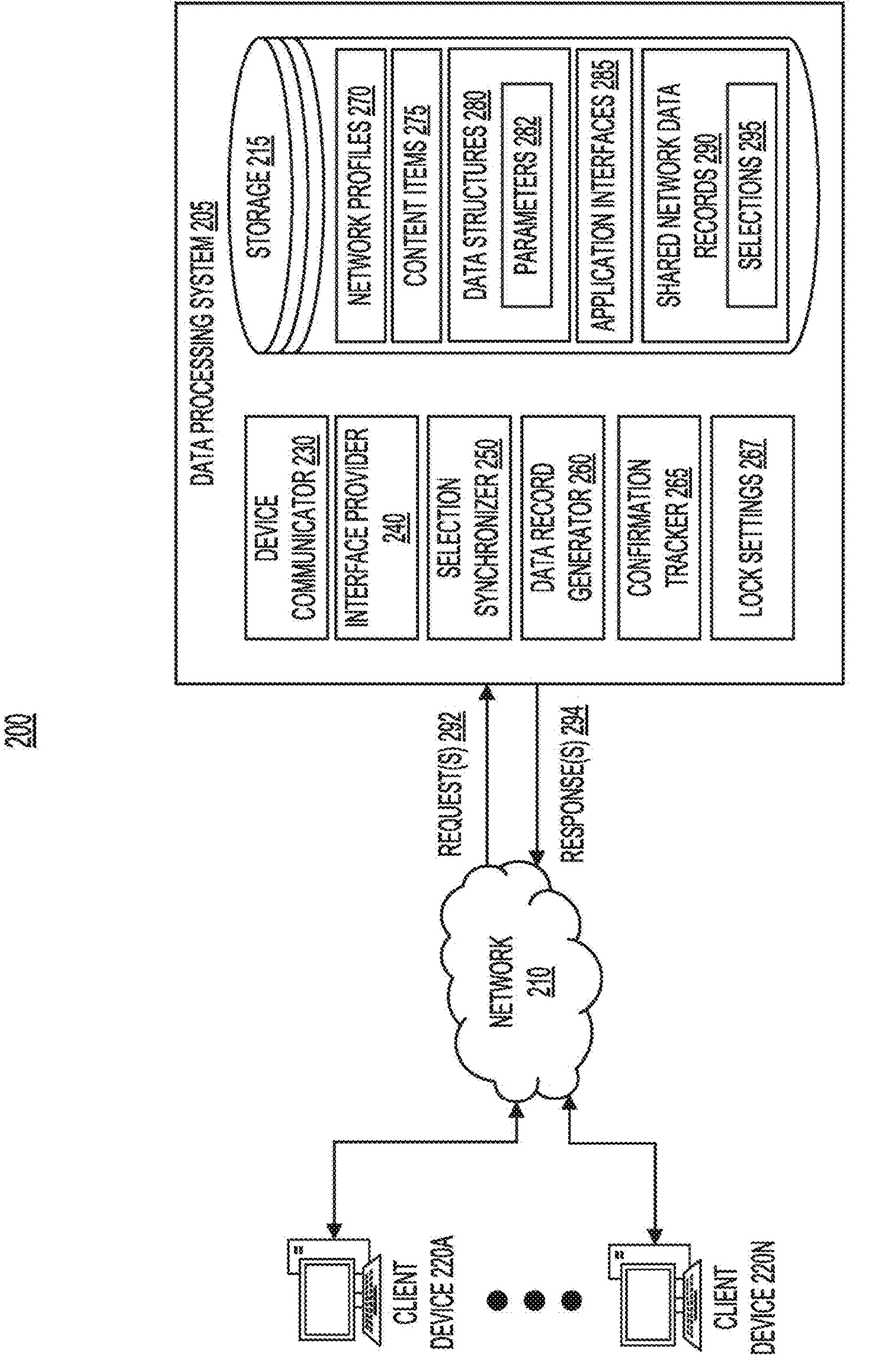
FIG. 2 is a block diagram illustrating a system for modifying network data records using multiple devices, in accordance with one or more implementations.

Referring now to FIG. 2, illustrated is a block diagram of a system 200 for modifying network data records using multiple devices. The system 200 can include a data processing system 205, a network 210, and one or more client devices 220A-220N (sometimes referred to herein as the "client device(s) 220"). The data processing system 205 can include a device communicator 230, an interface provider 240, a selection synchronizer 250, a data record generator 260, a confirmation tracker 265, and lock settings 267. The data processing system 205 can further include storage 215. The storage 215 can include network profiles 270, content items 275, data structures 280, parameters 282, application interfaces 285, shared network data records 290, and selections 295.

Each of the components (e.g., the data processing system 205, the network 210, the storage 215, the client devices 220A-220N, the device communicator 230, the interface provider 240, the selection synchronizer 250, the data record generator 260, the confirmation tracker 265, the lock settings 267, the network profiles 270, the content items 275, the data structures 280, the parameters 282, the application interfaces 285, the shared network data records 290, the requests 292, the responses 294, the selections 295, components thereof, etc.) of the system 200 can be implemented using hardware components or a combination of software with hardware components of a computing system, such as the server 106, the client computing system 102, and/or the computing system 100 described in connection with FIGS. 1A-1D, or any other computing system described herein.

The data processing system 205 can include one or more processors and non-transitory memory (e.g., one or more processing circuits). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The network 210 can facilitate communication between the data processing system 205 and the client devices 220A-220N. The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the server 106, the client computing system 102, the computing system 100, etc.) may also communicate wirelessly with the computing devices of the network 210 via a proxy device (e.g., a router, network switch, or gateway).

The client devices 220A-220N can communicate with the data processing system 205 to initiate, modify, and confirm shared network data records, as described in further detail herein. Each client device 220 can include at least one processor and a memory (e.g., a processing circuit). The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client device 220 can include one or more computing devices or servers that can perform various functions as described herein. The client device 220 can include any or all of the components and perform any or all of the functions of the client computing system 102 or the computing system 100 described in connection with FIGS. 1A-1D, or any other computing system described herein. The client device 220 may execute one or more applications (e.g., web-based applications, native applications, etc.) to perform any of the operations described herein. Although client devices 220A-220N are shown in FIG. 2, it should be understood that the system 200 may include any number of client devices 220 that may perform any of the operations described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display various graphical user interfaces (e.g., graphical user interfaces 300A, 300B, 300C, 300D, 300E, 300F, 300G, 300H of FIGS. 3A-3H, etc.), as described herein. The display can include a touch screen displaying an application, such as the gaming applications described herein. The display can include a border region (e.g., side border, top border, bottom border).

In some implementations, the display can include a touch screen display, which can display graphical content. The display can receive interactions from a player. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that enables a player to interact with and/or select one or more actionable objects as described herein. For example, a touchscreen display can enable interaction with one or more visual indications provided through the display of each mobile (or client) device 220, and responsive to an interaction (e.g., select, click-on, touch, hover), the client device 220 can generate an indication identifying the interaction, the selection, or an indication to of a command, among others. The touchscreen display can depict graphical elements representing an action query and generate an indication of the action chosen by the player. In some implementations, interactions received at the client device 220 can cause the client device 220 and/or the application executing thereon to transmit one or more requests 292 as described in further detail herein.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a native/web/gaming application that communicates with the data processing system 205 to place wagers (e.g., generate data structures 280), play games, access shared network data records 290 and/or selections 295 thereof, among other operations described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles 270, the content items 275, the data structures 280, the parameters 282 thereof (sometimes referred to herein as "data structure parameter(s) 282"), the application interfaces 285, shared network data records 290 and/or the selections 295 thereof, stored and maintained at the storage 215, and/or the lock settings 267 associated with one or more selections 295 and/or wagers corresponding to a shared network data record 290, as described in further detail herein, and/or any other information maintained or stored at the client device 220. The application (e.g., which may present or display one or more application interfaces 285) can generate one or more actionable objects, such as the actionable objects (e.g., interactive objects/elements) described herein below in connection with FIGS. 3A-3H, to a user (sometimes referred to herein as a "player") through a client device 220. Such actionable objects can include player-selectable text data, hyperlinks, buttons, graphics, videos, images, regions, and/or any other type of user interface element that generate a signal that is processed by the application executing on the respective client device 220.

In some implementations, one or more client devices 220 can establish one or more network sessions with the data processing system 205. In some implementations, the one or more network sessions can each include a channel or connection between the data processing system 205 and the one or more client devices 220. In some implementations, the one or more client devices 220 can transmit a request to join a communication session of the network sessions. The network sessions can include the execution of a virtual application, in which one or more client devices 220 can interact via communications with the data processing system 205 according to protocol of the virtual application. The protocol of the virtual application can include, but are not limited to, rules and/or instructions associated with the virtual application (e.g., an interactive network application, an interactive game, etc.). The network session may be used to perform any of the operations described herein. In some implementations, sessions may correspond to one or more shared network data records 290 and/or selections 295 thereof, as described in further detail herein. In some implementations, the network sessions may be or include WebSocket connections between the client device(s) 220 and the data processing system 205.

In some implementations, the one or more network sessions can be or include one or more application sessions (e.g., of the virtual application), an execution session, a desktop session, a hosted desktop session, a terminal services session, a browser session, a remote desktop session, a URL session and/or a remote application session, among others. Each network session can include encrypted and/or secure sessions, which can include an encrypted file, encrypted data or traffic. Each client device 220 can use the network session established with the data processing system 205 to carry out any of the functionalities described herein. For example, the application executing on each client device 220 can perform any of the client-side operations described herein, including displaying any of the user interfaces (e.g., application interfaces 285) shown in FIGS. 3A-3H, and/or any other types of user interfaces described herein.

Each of the client devices 220 can be computing devices that may communicate via the network 210 to access information resources, such as web pages via a web browser or application resources via a native application executing on a client device 220. When accessing information resources, such as instructions or assets for displaying, presenting, modifying, or navigating graphical user interfaces, a client device 220 can execute instructions embedded in native applications or in information resources that may cause the client devices 220 to display various application interfaces 285, such as the user interfaces shown in FIGS. 3A-3H. The application interfaces 285 can include, for example, application interfaces 285 that present different types of image-based search results or other types of interactive graphical user interfaces. In general, the graphical user interfaces may include various types of interactive or non-interactive assets, such as images, video, animations, graphics, audio, or other content, among others, that is presented to a user via the input or output interfaces of a client device 220.

In response to interactions with graphical user interface elements, such as elements of application interfaces 285, the client devices 220 can transmit requests 292 which can include any of the information described herein or correspond to any actions described therein, such as network profile identifiers 270, data structures 280, parameters 282, selections 295, or other signals to the data processing system 205. Information transmitted by the client devices 220 can be used to update the state of shared network data records 290. Shared network data records 290 can be updated, for example, based on receiving interaction information, such as selections 295 of data structures 280 (and/or parameters thereof), from a client device 220 identified as a member of the shared network data record 290, among others. In some implementations, a client device 220 can transmit a request 292 to access a shared network data record 290 via the data processing system 205. The request 292 can include, for example, a request to access one or more data structures 280 and/or selections 295 of a shared network application feed 290, a request to join or access a shared network application feed 290, such as by including a network profile identifier 270 or a device identifier, a request to modify or update a selection 295 of a data structure 280 and/or parameters 282 thereof, a request to remove a member (e.g., associated with an identified network profile 270) from a shared network data record 290, a request to modify attributes of a shared network data record 290, a request to update lock settings 267 of one or more selections 295 and/or of a wager to be executed according to a shared network data record 290, among any other operations described herein. The request(s) 292 can be transmitted as, or can include, a hypertext transfer protocol request message, a file transfer protocol message, a WebSocket message, an email message, a text message, or any other type of message that can be transmitted via the network 210, among others.

The client devices 220 can transmit requests 292 to the data processing system 205 via the network 210, where each request 292 can specify an action related to a shared network data record 290, such as initiating a session, adding or removing a data structure 280 (e.g., a selection 295), updating configuration parameters 282, and/or updating lock settings 267, among others. In response to receiving a request 292, the data processing system 205 can generate a response 294 that includes updated state information, confirmation of the requested action, or an error indication if a policy constraint is violated, among others. The response 294 can include data such as the current contents of the shared network data record 290, the lock settings 267 of individual data structures 280, the attribution information (e.g., associated network profile 270) for each data structure 280, or the outcome of a graphical element update, among others. In some implementations, the response 294 can provide a token for session reentry, an updated list of member network profiles 270, and/or a notification of a network profile 270 removal or addition, and/or nay other notifications or information described herein. The client devices 220 can receive the response 294 and update the presentation of the application interface(s) 285 described herein to reflect the current state of the shared network data record 290, such as by rendering new graphical elements, updating lock indicators, or displaying provenance markers, among others. In some implementations, the client devices 220 can store the received state information locally to enable catchup and history replay after a transient disconnect or reentry event. The responses 294 may be WebSocket response messages, in some implementations.

The storage 215 can store or otherwise maintain any of the information described herein. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, and/or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-3E, etc.), or any other computing devices described herein.

The storage 215 can include one or more network profiles 270. Each network profile 270 can be associated with a user (sometimes referred to herein as a "player") of a client device 220. The network profiles 270 may sometimes be referred to herein as "player profiles 270". A network profile 270 of a player can be a user profile that includes information about the player and information about one or more of the client devices 220 used to access the data processing system 205 using the network profile 270. For example, identifiers of the network profile 270 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others.

The network profile 270 can store information about placed wagers (e.g., selected wager opportunities via selections 295, data structures 280, parameters 282, and/or wagers placed according to shared network data records 290) that are provided/placed/selected by the player via requests 292 transmitted to the data processing system 205. The network profile 270 can store any information about the player, including a credit balance, wager information (e.g., an amount of a wager/side wager, a timestamp associated with a wager/side wager, a client device identifier of a client device 220 that was used to place the wager/side wager, etc.), information indicating membership of one or more shared network data records 290, information indicating which selections 295 of data structures 280 the player has made for corresponding shared network data record(s) 290, and/or any other information described herein. The network profile 270 can store information about a client device 220 used to access the data processing system 205 such as an IP address, a MAC address, a GUID, a network profile name (e.g., the name of a user of the client device 220, etc.), device name, among others. For example, the network profile 270 can store location information determined based on interactions between each client device 220 and the data processing system 205. In some implementations, the network profile 270 can be created by the data processing system 205 in response to the network profile creation request 292 transmitted by a client device 220. The network profile 270 creation request can include any of the network profile information described herein.

The storage 215 can include one or more content items 275. The content items 275 can include graphical elements, display instructions, or data structures containing information to be displayed for different shared network data records 290 (and/or selections 295 thereof), data structures 280, parameters 282, and/or other displayable content described herein. In some implementations, the content items 275 can include visual representations of wager opportunities (e.g., data structures 280), such as moneyline wagers, point spread wagers, over/under wagers, parlay wagers, or prop bets. The content items 275 can include display data or content for fantasy sports contest entries, athlete statistics, team logos, event schedules, venue information, or league standings, among others. The content items 275 may be provided to represent selections 295 in shared network data records 290 and/or events related to shared network data records 290, such as indications of members joining/being added to the shared network data record 290, members leaving/being removed from the shared network data record 290, information indicating changes in lock settings 267 for selections 295 and/or wagers relating to shared network data records 290, or any other event or aspect related to one or more shared network data records 290 described herein. The content items 275 may include user interface elements (or display instructions corresponding thereto) that can be transmitted to the client device 220 for presentation via one or more graphical user interfaces/application interfaces 285.

The data structures 280 can store selectable data structures for inclusion in shared network data records 290. The parameters 282 can store parameters associated with the data structures 280. The data structures 280 may include one or more wager opportunities with one or more associated wager parameters (e.g., data structure parameters 282). In some implementations, the data structures 280 can include placed wagers (e.g., wager opportunities selected by players), which can be associated with corresponding network profiles 270 of the players. Each data structure 280 can represent a placed wager or a wager opportunity corresponding to a corresponding live event (e.g., a sporting event currently being played, an upcoming sporting event that has not yet started, or others). The data structures 280 can store or otherwise be associated with data structure parameters 282, which can include information about each placed wager or wager opportunity, such as the associated live event or events, the type of wager or wager opportunity, or the outcome selected or possible outcomes for the wager opportunity, among others.

For example, a data structure 280 can include a wager placed on a football game between Team A and Team B, with the player selecting Team A to win. In another example, a data structure 280 corresponding to a wager opportunity may identify a football game, and include data structure parameters 282 providing possible selectable outcomes for Team A or Team B. The data structure parameters 282 can also include additional information such as the date or time the wager was placed, the odds at the time of placement or current/updated odds of the wager opportunity, or any conditions applied to the wager, among others. In some implementations, the data structure parameters 282 can specify the type of the wager or wager opportunity, such as moneyline wagers, point spread wagers, over/under wagers, parlay wagers, prop bets, or futures wagers, among others. The data structures 280 may include multiple wager opportunities, such as selections of multiple outcomes for a tournament bracket or similar combination of selections for wagers having multiple outcomes, such as parlay wagers, exotic wagers, progressive parlay wagers, or others.

In some implementations, odds (e.g., which may be stored as part of corresponding parameters 282) associated with the wager opportunities of data structures 280 can be dynamically adjusted based on various factors, such as live event data or changes in betting volume, among others. In some implementations, changes in the state of live events may cause, the data processing system 205 can recalculate or adjust wager odds for affected wager opportunities. In some implementations, the data processing system 205 can track the popularity of specific wager types or specific wager opportunities, such as straight bet wagers, same-game parlay wagers, exotic wagers, or proposition wagers, among others. The data processing system 205 can track the number of times the corresponding wager types or wager opportunities have been selected. For example, each wager opportunity of the data structures 280 can include or be associated with a counter that is incremented each time the wager opportunity is placed by a player via the data processing system 205. In some implementations, the counter can be displayed as part of the content items 275 corresponding to one or more wager opportunities of the wager opportunities.

The data structures 280 can include one or more corresponding parameters 282. The data structure parameters 282 associated with these wagers or wager opportunities can include various attributes that define the characteristics of the placed wager or wager opportunity. For example, the data structure parameters 282 can include the amount wagered by the player or possible wagering limits for wager opportunities, which can be stored as a numerical value representing the stake in a specified currency. The data structure parameters 282 can also include the specific wager selections made by the player or possible outcome selections for wager opportunities, such as the team or athlete chosen in a moneyline bet, the point spread selected in a spread bet, or the combination of selections in a parlay wager.

In some implementations, the data structure parameters 282 can include odds values associated with each selection or possible selection, which can be represented in various formats such as decimal odds, fractional odds, or American odds notation. The data structure parameters 282 can include timestamp information indicating when the wager was placed, when the wager opportunity expires, or when the odds were last updated. In some implementations, the data structure parameters 282 can include status indicators showing whether a wager is active, settled, or pending resolution, or whether the wager opportunity is still available to wager on. The data structure parameters 282 can include potential payout calculations that determine the return if one or more selected outcomes of the wager is successful. The data processing system 205 can use these data structure parameters 282 to manage, process, place, or otherwise display wagers, update player balances, or provide accurate information to players about their active or past wagers or available wager opportunities.

The application interfaces 285 can store definitions, templates, and/or instructions for the presentation of graphical user interfaces at client devices 220. The definitions, templates, or instructions can be encoded as markup language documents, configuration files, or serialized objects, among others, that specify layout, component structure, or rendering logic for graphical user interface elements. The application interfaces 285 can implement multiple interface layouts or components, such as bet slip panels (e.g., overlays, etc.), configuration dialogs, notification banners, or attribution markers, where each layout or component can correspond to a specific interface region or element.

The application interfaces 285 can be stored within storage 215 as data objects, files, data structures, or similar, and may be indexed and/or versioned according to session state, player role (e.g., member, owner/administrator, etc.), device type, and/or other contextual parameters, which can allow retrieval of the corresponding interface definition(s) for a given session/shared network data record 290. In some implementations, the application interfaces 285 can be associated with various data structures, such as linking interface templates to particular data structures 280, parameters 282, content items 275, and/or network profiles 270, and such associations can facilitate dynamic rendering of collaborative features, such as per-data structure 280 attribution and/or role-based interface controls (e.g., updating of configuration settings). The application interfaces 285 can be updated in response to various conditions, including but not limited to changes in shared network data records 290, selections 295, and/or updated data structures 280 and/or parameters 272, and client devices 220 can receive updated interface instructions via communications from the data processing system 205 as described herein.

The application interfaces 285 can implement real-time or near real-time synchronization of user interface state across multiple client devices 220 by referencing interface definitions that interact with the selection synchronizer 250 or the data record generator 260. In some implementations, the application interfaces 285 can implement logic and/or include metadata that specifies which interface elements are to be updated/provided/displayed in response to changes in shared network data records 290, selections 295, and/or lock settings 267, among others. The application interfaces 285 can store mappings between interface regions and data, including but not limited to mapping/associating a network profile 270 with a data structure 280/selection 295 and/or associating a lock indicator with a selection 295. In some implementations, the application interfaces 285 can define conditional presentation rules that determine visibility, interactivity, and/or styling of interface elements based on session state, permissions, and/or other contextual information. In some implementations, the application interfaces 285 can include version identifiers or compatibility metadata such that client devices 220 render a correct interface layout for a given application state. The application interfaces 285 can be transmitted to client devices 220 as part of response messages 294 or as standalone interface updates, as described herein.

In some implementations, security and/or access control permissions can be applied to the application interfaces 285 to restrict access to certain interface elements and/or features. The application interfaces 285 can include access control lists, role-based visibility flags, and/or encrypted portions that are decrypted only by authorized client devices 220 and/or network profiles 270. The data processing system 205 can determine which application interface 285 to transmit to or cause presentation of at a given client device 220 based on the associated network profile 270, shared network data record 290 metadata, and/or device identifier, among others. The application interfaces 285 can implement dynamic/automatic permission checks, such that interface elements for administrative actions (e.g., adding/removing a player profile 270, modifying configuration settings, etc.), are presented only for players with the appropriate session role.

In some implementations, the application interfaces 285 may be stored locally at the client devices 220, where each client device 220 can retrieve interface definitions from storage or a local cache. The data processing system 205 can generate or update interface instructions or data objects that define the layout, content, or interaction logic for the application interfaces 285. The data processing system 205 can transmit incremental or full interface updates to the client devices 220 using WebSocket connections established between the data processing system 205 and the client devices 220. Upon receiving an update message via a WebSocket connection, a client device 220 may parse the received data and overwrite or modify the corresponding application interfaces 285 in local memory. The client device 220 can render the updated application interface 285 for presentation to a user, for example, by updating graphical elements, interactive controls, and/or attribution/lock markers in response to state changes in a shared network data record 290 and/or selection 295. The data processing system 205 can detect session events such as additions or removals of selections 295, changes in lock settings 267, changes in membership (e.g., added or removed network profiles 270), and/or modifications to configuration parameters, and can generate corresponding interface update messages for transmission to all participating client devices 220.

The shared network data records 290 can store records generated by the data record generator 260 for collaborative use by multiple client devices 220 according to the techniques described herein. Each shared network data record 290 can represent a server-hosted bet slip session that is accessible by multiple client devices 220 and maintained as one or more data structures within storage 215. The structure of each shared network data record 290 can include a unique session/data record identifier, one or more outcome identifiers for selection 295 thereof, player attribution metadata such as an "added by" field, a timestamp, or similar metadata, one or more associations to corresponding lock settings 267, and one or more configuration parameters, among other information described herein. In some implementations, the shared network data records 290 can be stored in relational tables, document stores, and/or distributed memory regions within storage 215, and may include reference indexing for retrieval by session or player.

The shared network data records 290 can be updated according to the techniques described herein. For example, the shared network data records 290 can be updated in response to actions such as additions or removals of selections 295, changes to lock settings 267, additions/removals of network profiles 270, and/or modifications to configuration settings. Such updates may be provided to one or more participating client devices 220 associated with member network profiles 270, as described herein. In some implementations, the shared network data records 290 can include associations with other data entities, such as references to network profiles 270 as participants/owners/veiwers, identifiers of selections 295 and/or corresponding data structures 280 (and/or parameters 282 thereof), and/or pointers to configuration parameters and/or lock settings 267.

The shared network data records 290 can be stored in storage 215 for the duration of an active session and/or according to a defined retention policy for completed or expired shared network data records 290. State changes in a shared network data record 290 can be caused, for example, by actions from one or more client devices 220, as described herein. The data processing system 205 can detect such actions and generate corresponding updates to the shared network data record 290 in accordance with the techniques described herein. In some implementations, the shared network data records 290 can include a history of state changes to enable catchup and/or history replay for client devices 220.

In some implementations, the shared network data records 290 can include one or more fields that specify session-level metadata, such as an administrator identifier, configuration settings, and/or a list of member network profiles 270. The shared network data records 290 can store pointers to lock settings 267 to track per-selection 295 and/or per-network profile 270 lock status, and/or can identify specific configuration parameters that define guardrails for wager auto-placement. The storage format of the shared network data records 290 can permit efficient indexing by session identifier, user identifier, or outcome identifier, among others.

The shared network data records 290 can store or be stored in association with configuration settings that specify the type of wager and/or collaborative session represented by each record, such as a parlay wager in which multiple selections 295 are aggregated into a single combined wager, a moneyline wager in which each selection 295 corresponds to a separate moneyline outcome, and/or other wager types such as point spread wagers, over/under wagers, round robin wagers, teaser wagers, and/or proposition wagers, among others. In some implementations, the configuration settings of a shared network data record 290 can specify a maximum wager amount, a minimum wager amount, a maximum overall odds value, a minimum overall odds value, or a minimum/maximum number of participant player profiles 270, among others.

In some implementations, the configuration settings can further specify constraints such as a minimum or maximum number of total selections 295 for the shared network data record 290, a list of permitted or blocked outcome types, and/or a restriction on the types of events or markets eligible for inclusion in the shared network data record 290, among others. In some implementations, the configuration settings can include parameters for auto-placement of wagers, such as enabling or disabling wager auto-placement on lock functionality subject, restrictions for minimum/maximum odds, and/or restrictions on minimum/maximum wager amounts for each participant network profile 270. Additional constraints/restrictions/configuration settings may also be implemented and are not necessarily limited to the foregoing examples.

The shared network data records 290 can store or be associated with corresponding selections 295 of data structures 280 selected via client devices 220A-220N for inclusion in the shared network data records 290. Each selection 295 can represent a data object stored in storage 215 that encodes a player-initiated choice of a wager opportunity for a corresponding shared network data record 290. Each selection 295 can be associated with a respective data structure 280, where the data structure 280 can define a particular wager opportunity such as a specific sporting event outcome, a type of bet, or a market selection, among others. Each selection 295 can reference corresponding data structure parameters 282, which may include current odds, potential outcomes, wager status, possible wager amount, and/or market or wager type, among others. Selections 295 can be generated by client devices 220 and transmitted to the data processing system 205 for storage and association with the relevant shared network data record 290. In some implementations, each selection 295 can be stored as an indexed record or entry within a database table maintained in storage 215, and each selection 295 may include metadata such as a timestamp, a user identifier, and/or a shared network data record 290 identifier, among others.

Updates to selections 295 may occur in response to user actions such as adding, removing, and/or locking (e.g., updating lock settings 267) for a wager opportunity, with the data processing system 205 propagating such changes to all participating client devices 220 according to the techniques described herein. In some implementations, the data processing system 205 can monitor the state (e.g., open, closed, outcomes, etc.) of the data structure 280 associated with each selection 295 and generate notifications or interface updates reflecting changes in selection status. Each selection 295 can be associated with a lock status in corresponding lock settings 267, which may indicate whether a particular selection 295 is finalized or pending further modification within the shared network data structure 295.

The lock settings 267 can store information related to locking selections and execution or prompted execution of a corresponding shared network data record 290. The lock settings 267 can include data structures maintained in memory or persistent storage within storage 215, where each data structure can encode lock status information for selections 295 or player profiles 270. The lock settings 267 can include at least two types, such as per selection 295 lock settings, which indicate whether a player has locked in their respective selection or selections 295, or per player profile 270 lock settings, which indicate whether a player profile 270 has locked in a wager amount for a shared network data record 290. In some implementations, the per selection 295 lock settings may be represented as Boolean flags or enumerated status fields associated with each selection 295, and such lock status may be updated in response to user actions transmitted from client devices 220. The per player profile 270 lock settings may record whether a player profile 270 has committed to a wager amount for the shared network data record 290, or may include additional metadata such as timestamps, wager values, or execution triggers. The lock settings 267 may be associated with both selections 295 or player profiles 270 through indexing, referencing, or mapping within storage 215, and updates to lock settings 267 may be propagated to other components such as the data record generator 260 or confirmation tracker 265.

The lock settings 267 may be updated in real time based on received requests 292 from client devices 220, where each request 292 can specify a lock or unlock action for a selection 295 or a wager amount associated with a player profile 270. The data processing system 205 can monitor the state of lock settings 267 to determine whether all required selections 295 or wager amounts have been locked, or whether conditions for execution or prompted execution of a wager for a shared network data record 290 have been satisfied. In some implementations, the data processing system 205 can generate notifications and/or application interface 285 updates for client devices 220 based on changes to lock settings 267, for example, by indicating lock status for individual selections 295 or for whether a network profile 270 has confirmed/locked in a wager for a corresponding shared network data record 290. In some implementations, the lock settings 267 may store historical lock status changes, such as timestamps or network profile 270 identifiers. The stored lock status can be used to determine when to execute and/or prompt execution of a wager for a shared network data record 290, as described in further detail herein.

The lock settings 267 can enable collaborative workflows by coordinating lock status across multiple client devices 220 in a shared session. The lock settings 267 may allow each participant network profile 270 to independently lock or unlock their respective selections 295 and/or wager amounts. The data processing system 205 can store mappings between lock settings 267 and associated selections 295 and/or player profiles 270, which may be used to present user interface elements such as lock icons, status banners, or confirmation prompts at client devices 220. The lock settings 267 may be queried and/or updated by other components of the data processing system 205, such as the selection synchronizer 250 or interface provider 240, according to the techniques described herein. The lock settings 267 may be retained in storage 215 for the duration of the shared network data record 290 or according to defined retention policies.

Referring now to the operations of the data processing system 205, the device communicator 230 can receive, from a first client device 220, a request 292 to initiate a shared network data record 290. The device communicator 230 can monitor incoming network traffic for request 292 messages originating from any client device 220 by listening on one or more communication ports or channels associated with the network 210. The device communicator 230 can implement any type of communication protocol, including but not limited to WebSocket messages, HTTP requests, or other supported communication protocols, among others. The request 292 transmitted by the first client device 220 can include a payload that specifies an identifier for the requesting client device 220, metadata for the shared network data record 290, and/or session initiation parameters such as a session type, invitation method, and/or configuration settings, among others. The device communicator 230 can parse the received request 292 by extracting the relevant fields from the message payload, such as the client device identifier, session metadata, or any authentication tokens. The device communicator 230 can validate the request 292 to determine whether the intent of the request 292 is to initiate a new shared network data record 290 by inspecting the message type, required fields, or protocol-specific headers.

The various configuration settings for a shared network data record can be specified via one or more graphical user interfaces presented at a client device 220. The application interface 285 can present interactive user interface elements, such as buttons, sliders, or input fields, that can initiate a configuration of a shared network data record 290 in response to player interaction. In some implementations, a player can select a user interface element of the application interface 285 to prompt presentation of a configuration panel or overlay, where the player can specify parameters such as maximum odds, minimum odds, or maximum legs per player, among others. The application interface 285 can transmit the selected configuration settings to the data processing system 205 for storage in association with the shared network data record 290. In some implementations, the application interface 285 can dynamically update the available configuration options based on session state or player role. Examples of graphical user interfaces for specifying configuration settings are described in connection with FIGS. 3A and 3B.

The device communicator 230 can perform authentication or session validation steps before processing the initiation request 292. The device communicator 230 can determine whether the requesting client device 220 is associated with a valid network profile 270 or possesses a valid authentication token. In some implementations, the device communicator 230 can verify the integrity of the request 292 by checking digital signatures, session tokens, or other security credentials included in the message payload. The device communicator 230 can correlate the received identifiers with stored network profiles 270 or allowed users lists to determine whether the client device 220 is authorized to initiate a shared network data record 290. If the authentication or session validation is successful, the device communicator 230 can proceed to process the request 292 and initiate the creation of the shared network data record 290. In some implementations, the device communicator 230 can generate a response 294 or notification if the authentication or validation fails.

Once a shared network data record 290 is initialized by a creator player, the data processing system 205 can generate a unique link that corresponds to the shared network data record 290. The data processing system 205 can store the generated link in association with the shared network data record 290 in the storage 215. The creator player can transmit the link to one or more second players, such as players having corresponding player profiles 270, by sharing the link through a text message or by using messaging functionality provided by the data processing system 205 between network profiles 270. In some implementations, the data processing system 205 can provide an interface for the creator player to select one or more recipient player profiles 270 and initiate sharing of the link using an internal messaging feature. The link can encode an identifier of the shared network data record 290, which allows a second player receiving the link to access or request admission to the corresponding shared network data record 290. In some implementations, the data processing system 205 can monitor link sharing events and update shared network data structure 290 metadata for the shared network data record 290 to reflect invitations and/or pending admissions for second players.

In some implementations, a request to initiate a shared network data record 290 can identify one or more desired members for participation in the shared network data record 290. The request can include identifiers for each invitee, such as a device identifier, a network profile identifier, or a user identifier, among others. The device communicator 230 can receive the request and extract the identifiers of the desired members from the request payload. The device communicator 230 can store the extracted identifiers in association with the pending shared network data record 290 or update an allowed users list for the session. The device communicator 230 can generate invitation messages or notifications addressed to the identified invitees and transmit such messages via the network 210. In some implementations, the device communicator 230 can monitor for acceptance or confirmation messages from the invited players before updating the session state or granting access to the shared network data record 290.

The device communicator 230 can receive one or more requests identifying a second client device 220 for participation (e.g., to join, etc.) in the shared network data record 290. In some implementations, the initiation request can be transmitted from the first client device 220 that initiated the shared network data structure 290. In some implementations, the requests can include an identifier for the second client device 220 and/or a second network profile 270, such as a device identifier, a user identifier, or a network address, among others. The device communicator 230 can extract the identifier for the second client device 220 from the received request by parsing the request payload or by decoding a structured message field. The device communicator 230 can verify the extracted identifier by correlating the identifier with stored network profiles 270 or by performing an authentication check using a device registry or user directory. The device communicator 230 can update an allowed users list or a session participant registry to include the second client device 220 for the pending shared network data record 290. The device communicator 230 can generate a notification or an invitation message addressed to the second client device 220 and can transmit the message to prompt participation in the shared network data record 290.

In some implementations, the device communicator 230 can log the association between the first client device 220 and the second client device 220 for the shared network data record 290 by generating an entry or by updating a session event log for the shared network data record 290 in storage 215. The entry can store information such as the identifiers of the first client device 220 and the second client device 220, a timestamp of the association event, and/or a session identifier for the shared network data record 290, among others. The device communicator 230 can monitor for acknowledgment or response messages from the second client device 220 in response to the transmitted notification or invitation. In some implementations, the device communicator 230 can update the session state or the allowed users list based on the response received from the second client device 220. The device communicator 230 can propagate any resulting state changes to other participating client devices 220 by generating and transmitting update messages reflecting the current membership.

In some implementations, the device communicator 230 can receive, from the second client device 220, a confirmation message to initiate the shared network data record 290. The device communicator 230 can monitor an established communication channel, such as a WebSocket connection or a hypertext transfer protocol request, for incoming confirmation messages from the second client device 220, where each confirmation message may include a session identifier, a device identifier, or a session token, among others. The device communicator 230 can parse the received confirmation message to extract the session identifier or session token, and can perform authentication checks by verifying the session token against a stored list of valid tokens or by correlating the device identifier with an allowed users list. Upon successful validation of the confirmation message, the device communicator 230 can update the session state for the shared network data record 290 by marking the second client device 220 and/or corresponding network profile 270 as an active participant and/or by updating a confirmation status field in storage 215. A notification and/or message may be transmitted to other member client devices 220 to indicate that an additional member has been added.

The data processing system 205 can determine a threshold number of allowed member network profiles 270 for a shared network data record 290 based on configuration parameters or session metadata. The data processing system 205 can monitor the current number of member network profiles 270 associated with the shared network data record 290 and compare the current number to the threshold. If a request 292 to invite or admit an additional member network profile 270 is received after the threshold has been reached, the data processing system 205 can generate an error message or notification indicating that no further members may be added. In some implementations, the error message can be provided for display at the requesting client device 220 or at the client device 220 of the prospective member, and may include an indication that the maximum number of participants has been reached. The data processing system 205 can reject or ignore the request 292 to join or invite, or may provide user interface feedback to indicate the membership limit, among other operations.

The interface provider 240 can provide, for presentation at each of the first client device 220 and the second client device 220, a respective application interface 285 for generation of the shared network data record 290. The interface provider 240 can generate an application interface 285 definition by retrieving interface templates from storage 215 and populating such templates with session metadata, network profile 270 information, or shared network data record 290 state. In some implementations, the interface provider 240 can determine which application interface 285 to provide by evaluating the session role of each player, the current state of the shared network data record 290, and/or any permissions associated with the network profile 270 (e.g., administrator/owner privileges, participant/member privileges, etc.). In some implementations, the interface provider 240 can select interface layouts or features based on whether a player is an administrator, a standard participant, or an invited guest, or based on session-specific parameters such as lock settings 267 or configuration settings. The interface provider 240 can serialize the generated application interface 285 definition, generate update instructions, and/or reference graphical assets, and can transmit such output data to the client devices 220 via the network 210 to cause presentation of the various graphical user interfaces described herein (e.g., as described in connection with FIGS. 3A-3H).

In some implementations, the interface provider 240 can transmit application interface 285 definitions/updates to client devices 220 by generating network messages for each client device 220 and transmitting such messages over the network 210. The output data transmitted by the interface provider 240 can include serialized interface definitions that specify the layout, content, permissible actions, and/or state information for the application interface 285 or corresponding shared network data structure 290 or associated data. The interface provider 240 can determine the execution conditions for generating or transmitting an application interface 285 by monitoring for initiation of a shared network data record 290 session, receipt of a player action such as a selection or confirmation, or detection of a state change in storage 215, such as an update to the shared network data record 290 or a change in session membership. Upon detecting such a condition, the interface provider 240 can generate or update the application interface 285 and transmit the corresponding data to the relevant client devices 220.

In some implementations, the interface provider 240 can monitor for state changes in storage 215 or for incoming requests from client devices 220 that indicate a need to update the application interface 285. The interface provider 240 can retrieve updated session metadata, network profile 270 information, and/or shared network data record 290 state from storage 215 in response to such events. The interface provider 240 can generate a new or modified application interface 285 definition that reflects the current session state, player permissions, and/or available actions, or can generate incremental update instructions that modify affected portions of the interface and/or state information of the shared network data record 290. The interface provider 240 can transmit the updated interface definition and/or update instructions to the relevant client devices 220 via the network 210. In some implementations, the interface provider 240 can track which client devices 220 have acknowledged receipt of the updated application interface 285 and may retransmit updates as needed to maintain interface consistency. In some implementations, the interface provider 240 may transmit such information in response to corresponding requests from client devices 220.

In some implementations, the interface provider 240 can provide the respective application interface 285 for generation of the shared network data record 290 to a joining client device 220 in response to the confirmation message. The interface provider 240 can monitor incoming network communications for confirmation messages transmitted from joining client devices 220 and can determine that a confirmation message corresponds to a pending session admission event. Upon receipt of a confirmation message, the interface provider 240 can validate a session token or network profile 270 identity included in the message and can retrieve the current state of the shared network data record 290 from storage 215. The interface provider 240 can generate an up-to-date application interface 285 that reflects the session state by incorporating any selections 295 or configuration settings already present in the shared network data record 290. The interface provider 240 can transmit data to the joining client device 220 that includes interface definitions, session metadata, or graphical assets required for rendering the application interface 285. In some implementations, the interface provider 240 may update or retransmit the application interface 285 in response to changes in session membership, subsequent confirmation messages, or modifications to the shared network data record 290, among other conditions.

In some implementations, the interface provider 240 can cause presentation of the respective application interface 285 as an overlay for a graphical user interface of an application executing on the first client device 220 and the second client device 220. The interface provider 240 can generate overlay interface instructions or metadata that specify a z-order, transparency, or bounding region for the application interface 285 to appear above an existing graphical user interface. The client device 220 can render the overlay by invoking a display stack or rendering pipeline that supports layered interface components. The overlay presentation can allow concurrent interaction with both the shared network data record 290 interface or the underlying application by routing player input events, such as touch or pointer actions, to the overlay or the background application accordingly. The interface provider 240 can transmit overlay activation commands, interface state updates, or dismissal instructions to the client device 220 to trigger or control the overlay presentation. The overlay may be updated, hidden, or dismissed in response to player actions, session state changes, or receipt of new data from the data processing system 205, among others. Examples of such overlays are shown in connection with FIGS. 3A-3H.

In some implementations, the interface provider 240 can cause presentation of selections 295 of data structures 280 currently included in the shared network data record 290, if any, via the respective application interface 285 presented at the member client devices 220. The interface provider 240 can generate instructions or data objects that specify the visual or interactive representation of each selection 295 of data structure 280 currently included in the shared network data record 290, such as by serializing interface definitions or constructing update messages that encode selection identifiers, outcome parameters, or attribution metadata, among other operations. The interface provider 240 can retrieve the current set of selections 295 of data structures 280 currently included in the shared network data record 290 from storage 215 or from the active state of the shared network data record 290 by querying a session identifier or by referencing a data structure pointer associated with the session.

The interface provider 240 can determine which selections 295 of data structures 280 currently included in the shared network data record 290 are to be presented at each client device 220 by evaluating the state or user permissions, such as by filtering selections 295 based on participant role, lock status, or administrative restrictions, among others. The interface provider 240 can transmit the generated instructions or data objects to each client device 220 in a format such as a serialized interface definition or a structured update message, where each recipient client device 220 can receive and parse the transmitted data to render or update the presentation of the selections 295 of data structures 280 currently included in the shared network data record 290. The interface provider 240 can initiate such transmissions in response to execution triggers that include the addition, removal, or update of a selection 295 of a data structure 280 currently included in the shared network data record 290, a change in session membership, a modification of session configuration parameters, and/or a change in parameters 282 (e.g., odds) associated with a corresponding data structure 280 (e.g., wager).

The interface provider 240 can monitor the shared network data record 290 and/or data structures 280 for state changes that affect the presentation of selections 295 of data structures 280 currently included in the shared network data record 290 or their associated attributes. The interface provider 240 can repeat the retrieval, generation, and transmission process each time an execution trigger is detected (e.g., when a participant adds a new selection 295 of a data structure 280 currently included in the shared network data record 290, removes a selection 295 of a data structure 280 currently included in the shared network data record 290, when the session membership changes, when parameters 282 of a data structure 280 of a selection 295 are updated, etc.). In some implementations, the interface provider 240 can store a history of transmitted updates to enable catchup for client devices 220 that reconnect after a transient disconnect.

The selection synchronizer 250 can synchronize a selection 295 of a data structure 280 identified in a communication from a client device 220 among the application interfaces 285 presented at the member client devices 220 of the corresponding shared network data record 290. The selection synchronizer 250 can receive a communication from the client device 220 that specifies the selection 295 of a data structure 280, where the communication may include a selection identifier, a player identifier, a timestamp, and/or one or more configuration parameters for the selection. The selection synchronizer 250 can parse the received communication to extract the identifier of the data record 280 and/or associated metadata. The selection synchronizer 250 can update the shared network data record 290 to reflect the new or modified selection 295 by storing the identifier of the data record 280/selection 295, updating player/participant attribution, and/or storing the timestamp in association with the shared network data record 290. The selection synchronizer 250 can generate a synchronization message or update instruction that encodes the identifier(s), player/participant attribution, timestamp, and/or any relevant configuration parameters. The selection synchronizer 250 can transmit the synchronization message or update instruction to the member client devices 220 associated with the corresponding shared network data record 290.

The data structures 280 can be selected for inclusion in a shared network data record 290 by player interactions with various user interface elements presented by an application interface 285 executing on client devices 220. In some implementations, the application interface 285 can present actionable objects such as buttons, toggles, or list items that correspond to available wager opportunities or outcomes, where each actionable object can represent a respective data structure 280. For example, a user interface may display a list or grid of selectable entries for each sporting event outcome, a region with controls for adding selections, or a context menu invoked by a gesture, among others. In some implementations, the shared network data record 290 may be presented as an overlay over a portion of the graphical user interface presented at the client device 220, such that the player can view and select data structures 280 for inclusion in the shared network data record 290 while viewing at least a portion of application interface(s) 285 corresponding to the shared network data record 290.

When a player selects a data structure 280 via such a user interface element, the client device 220 can generate a selection signal that identifies the chosen data structure 280 and transmit an indication of the selection 295 to the data processing system 205. In some implementations, the data processing system 205 can automatically add the selected data structure 280 as a wager to the shared network data record 290 associated with the network profile 270, such that all participating client devices 220 receive a real-time update reflecting the new selection. In some implementations, the player may specify one or more shared network data structures 290 to which the selected data structure(s) 280 are to be added. The application interface 285 can update the presentation to indicate the inclusion of the selected data structure 280 in the shared network data record 290, for example, by displaying the wager in a panel, updating a leg counter, and/or presenting an attribution marker identifying the player who made the selection, among other operations described herein.

In some implementations, the selection synchronizer 250 can include additional data fields in the synchronization message, such as one or more identifiers, a conflict resolution flag, and/or a version number for the shared network data record 290. The selection synchronizer 250 can monitor the timing and/or ordering of received selection 295 updates by assigning sequence numbers and/or comparing timestamps to determine the most recent or valid update. In some implementations, the selection synchronizer 250 can process concurrent or conflicting selection updates by applying a conflict resolution policy, such as last-write-wins, player priority, and/or administrator override, among other conflict policies. The selection synchronizer 250 can generate or transmit updated synchronization messages to the application interface 285 at the relevant client devices 220 such that each client device 220 presents the current state of the shared network data record 290.

In some implementations, the selection synchronizer 250 can determine whether a selection 295 received from a client device 220 satisfies any restrictions identified in the configuration settings of the shared network data record 290 to which the selection 295 corresponds. The selection synchronizer 250 can retrieve configuration settings associated with the shared network data record 290 from storage 215, where such configuration settings may specify restrictions on selections 295. The selection synchronizer 250 can compare the received selection 295 against the identified restrictions by evaluating parameters such as odds limits, allowed categories, and/or a maximum number of selections per network profile 270, among other restrictions described herein. The types of restrictions that may be enforced can include, but are not limited to, minimum or maximum odds values (e.g., individually or aggregated across all selections of the shared network data record 290, for example, when the shared network data record 290 represents a shared parlay wager), permitted or blocked categories for data structures 280, and/or participant-specific constraints such as per-player selection limits. The selection synchronizer 250 can determine whether the received selection 295 complies with each restriction by comparing the relevant attributes of the selection 295 to the corresponding configuration setting. If the selection 295 violates a restriction, the selection synchronizer 250 can generate an error notification or trigger a request for player modification.

The selection synchronizer 250 can transmit feedback or a notification to the relevant client device 220 or application interface 285, where such feedback may include an error message, a warning, or an indication of the restriction that was not satisfied. In some implementations, the feedback can identify the specific restriction violated. The client device 220 can present the feedback to the player through the application interface 285, for example, by displaying a dialog, banner, or inline message. The selection synchronizer 250 can store the outcome of the restriction check in association with the shared network data record 290. In some implementations, the selection synchronizer 250 can update the state of the shared network data record 290 only if the selection 295 is accepted/complies with the restrictions.

In some implementations, the selection synchronizer 250 can determine whether a selection 295 satisfies at least one restriction that specifies a range of values for a parameter (e.g., odds) of the shared network data record 290. The selection synchronizer 250 can receive configuration settings from the shared network data record 290 that define an allowable range for a parameter, which in one example may be a minimum odds value or a maximum odds value. The selection synchronizer 250 can extract or determine the relevant parameter value from the selection 295, for example, by identifying the odds value associated with a wager opportunity referenced by the selection 295. The selection synchronizer 250 can compare the extracted parameter value to the configured range to determine whether the selection 295 complies with the restriction. The input data for this determination can include the selection 295 and the configuration settings, and the output can include an acceptance signal, a rejection signal, which may be communicated via a notification to the client device 220 as described herein. If the selection 295 falls outside the permitted range, the selection synchronizer 250 may trigger a response to the client device 220 indicating that the restriction is not satisfied.

In some implementations, the selection synchronizer 250 can determine whether a selection 295 satisfies at least one restriction that specifies a range of values for a parameter representing the total odds for the shared network data record 290, such as when the shared network data record 290 represents a parlay wager or other type of combined wager. The selection synchronizer 250 can receive configuration settings from the shared network data record 290 that define an allowable range for the total odds parameter, such as a minimum total odds value or a maximum total odds value. The selection synchronizer 250 can calculate a hypothetical total odds value for the shared network data record 290 by including the selection 295 under evaluation with all other selections 295 currently associated with the shared network data record 290. The selection synchronizer 250 can use a mathematical operation, such as multiplying the odds values of each included selection 295, or using a predetermined odds calculation function, to generate the hypothetical total odds value. The selection synchronizer 250 can compare the calculated total odds value to the configured range to determine whether inclusion of the selection 295 would cause the shared network data record 290 to violate the restriction. If the hypothetical total odds value falls outside the permitted range, the selection synchronizer 250 may trigger a response to the client device 220 indicating that the restriction is not satisfied.

In some implementations, the selection synchronizer 250 can determine whether a selection 295 satisfies at least one restriction that specifies a category for one or more data structures 280 to be included in the shared network data record 290. The selection synchronizer 250 can receive category-based restrictions from the configuration settings of the shared network data record 290, such as permitted market types and/or blocked wager categories. The selection synchronizer 250 can identify the category attribute of the selection 295 by referencing the associated data structure 280 and extracting the relevant category information. The selection synchronizer 250 can compare the identified category to the permitted or blocked categories specified in the configuration settings to determine compliance. The input data for this determination can include the selection 295 and the configuration settings, and the output can include a validation result or a rejection message. If the selection 295 does not satisfy the category restriction, the selection synchronizer 250 may prompt a notification or error to the client device 220.

In some implementations, the selection synchronizer 250 can determine whether a selection 295 satisfies at least one restriction that specifies a threshold number of data structures 280 to be included in the shared network data record 290. The selection synchronizer 250 can receive a threshold value from the configuration settings of the shared network data record 290, such as a minimum or maximum number of data structures 280 allowed. The selection synchronizer 250 can count or enumerate the current number of data structures 280 associated with the shared network data record 290 and consider the addition of the proposed selection 295. The selection synchronizer 250 can compare the updated count to the configured threshold to determine compliance with the restriction. The input data for this determination can include the current state of the shared network data record 290, the selection 295, and the configuration settings, and the output can include a compliance determination or a rejection notification. If the addition of the selection 295 would cause the threshold to be exceeded or not met, the selection synchronizer 250 may result in a feedback message or error notification to the client device 220.

The device communicator 230 can receive, from an owner/administrator client device 220 of a shared network data record 290, a request to restrict a client device 220/network profile 270 from accessing the shared network data record 290. The device communicator 230 can receive the request message from the client device 220 that specifies an action to restrict access/remove a participant. The request can include an identifier for the shared network data record 290 and an identifier for the second client device 220 and/or a network profile 270 associated with the participant to be removed. The device communicator 230 can parse the received request to extract the relevant identifiers and action type, referencing storage 215 or session metadata as needed. The device communicator 230 can validate the authority of the requesting client device 220, such as by determining whether the sender is an owner or administrator of the shared network data record 290.

Upon validation, the device communicator 230 can update the shared network data record 290 to remove the participant. The device communicator 230 can identify the network profile 270 or client device 220 to be removed by referencing an identifier included in the request or by correlating the identifier with session metadata stored in storage 215. The device communicator 230 can modify the shared network data record 290 by deleting an association between the removed network profile 270 and the shared network data record 290 or by updating a participant list or allowed users list to exclude the corresponding network profile 270. The device communicator 230 can generate a notification or response message for the removed client device 220 that indicates removal from the shared network data record 290. In some implementations, the notification can include an error message, a message indicating removal by an administrator, or a prompt to rejoin or request access, among others. The device communicator 230 can transmit the notification to the removed client device 220 via the network 210, and the client device 220 can present the notification to the player through the application interface 285 or a graphical user interface overlay. The device communicator 230 can update the session state for remaining participants by transmitting an updated participant list or a notification indicating that the network profile 270 has been removed.

The data record generator 260 can execute, responsive to receiving the respective request indicating confirmation from each one or more members client device 220, the shared network data record 290 according to the selections 295 thereof. The data record generator 260 can receive confirmation requests from one or more member client devices 220, where each confirmation request can indicate that a participant has finalized their selections 295 or wager parameters (e.g., wager amount(s), etc.) for the shared network data record 290. In some implementations, the data record generator 260 can generate wager in association with the corresponding network profile(s) 270 executing the shared network data record 290 that reflects the selections 295 at the time of execution, such that the state of the shared network data record 290 is preserved for each participant as of their respective execution/confirmation request. The data record generator 260 can allow each participant to execute a wager independently, such that execution for one participant does not require simultaneous execution by all other participants. The data record generator 260 can associate each executed wager with the corresponding network profile 270, storing the wager parameters and selections 295 as committed by the participant.

The data record generator 260 can monitor for modifications to the shared network data record 290 after a participant executes, such as new or removed selections 295, which do not affect wagers already executed by other participants. In some implementations, the data record generator 260 can store a record of the selections 295 and wager parameters (e.g., odds, wager amounts, etc.) associated with each network profile 270 at the time of execution. If a participant wishes to execute a modified slip after execution by another participant, the data record generator 260 may execute the updated shared network data record 290. In some implementations, the data record generator 260 can generate notifications to client devices 220 when modifications to the shared network data record 290 occur after a participant has executed their wager.

In some implementations, the data record generator 260 can receive a wager amount as a parameter for executing the shared network data record 290 from the first client device 220. The data record generator 260 can receive the wager amount in a specified format, such as a numerical value with an associated currency type, and can determine whether the received amount satisfies minimum or maximum values or complies with any restrictions specified in configuration settings for the shared network data record 290. The data record generator 260 can store the data record parameter in association with the corresponding network profile 270 and the current state of the shared network data record 290. The data record generator 260 may generate a confirmation or feedback message to the first client device 220 indicating acceptance or rejection of the wager amount based on the validation outcome. The data record generator 260 can execute the wager by generating an association between the executed wager and the corresponding network profile 270.

The data record generator 260 can determine a wager outcome for each executed shared network data record 290 by monitoring the resolution of each selection 295 included in the shared network data record 290. The data record generator 260 can retrieve outcome data for each selection 295 from storage 215 or from an external data feed, where the outcome data may indicate whether a particular outcome has been determined as a win, loss, or push, among others. The data record generator 260 can correlate each selection 295 with the corresponding data structure 280 and parameters 282 to determine the final status of each leg. In some implementations, the data record generator 260 can aggregate the individual outcomes of the selections 295 according to the wager type (such as parlay, single, or round robin, among others) to determine the overall wager outcome for each network profile 270 associated with the shared network data record 290.

The data record generator 260 can store the determined wager outcome and/or the outcome of each selection 295 in association with the relevant network profile 270 in storage 215. The data record generator 260 can generate a notification or response 294 for each client device 220 associated with a member network profile 270 that executed the shared network data record 290, where the notification can include the resolved status of the wager, the outcome of each selection 295, and/or the resulting payout, among other information. In some implementations, the data record generator 260 can cause presentation of a summary interface at each client device 220, where the summary interface can display the outcome of the shared network data record 290, the outcome of each selection 295, and/or attribution information for each player. The data record generator 260 can update the application interfaces 285 to reflect the final results and can provide historical records of wager outcomes for later retrieval using corresponding network profiles 270.

The data processing system 205 can provide locking functionality for selections 295 and shared network data records 290. The data processing system 205 can receive one or more confirmation signals from client devices 220 that have made a selection 295, where each confirmation indicates that the respective selection 295 is finalized and will not be changed by the player that provided the selection 295. For example, a client device 220 can transmit a confirmation message for a selection 295, which can include identifiers such as a selection 295 identifier, a network profile 270 identifier, and/or a shared network data record 290 identifier, and the data processing system 205 can record the lock status in association with the relevant selection 295 as part of the lock settings 267. The data processing system 205 can monitor the lock status of all selections 295 associated with a shared network data record 290, and can determine when all required confirmations have been received. In some implementations, a player can transmit a lock message for a shared network data record 290, which signals an intent to execute the shared network data record 290, or an intent to be notified with a prompt to execute the shared data record 290, once all selections 295 have been confirmed by their respective providers. The data processing system 205 can update the lock settings 267 according to the received confirmation messages and lock messages, generate instructions to indicate the lock status(es) to other member client devices 220, or trigger further processing such as execution or settlement of the shared network data record 290, as described herein.

To do so, the interface provider 240 may cause presentation of one or more indicators in association with a selection 295 at the application interface 285 of a client device 220 that provided that selection 295. The interface provider 240 can generate rendering instructions and/or provide information that specifies the placement or indicates the state of a confirmation indicator adjacent to a selection 295 that a player has made and can transmit such instructions/information to the client device 220 for presentation. The confirmation indicator may visually distinguish selections 295 that are eligible for confirmation or have been confirmed by the player associated with the client device 220, for example, by displaying a corresponding icon, color, and/or status marker. In one example, the indicators may be an lock icon in an unlocked state. The confirmation indicator can be interactive, such that a player may transmit a confirmation signal using the application interface 285 to indicate to other members that the selection 295 is locked and will not be changed, in response to an interaction with the confirmation indicator. The interface provider 240 and/r the client device 220 can update the application interface 285 in real time to reflect changes in confirmation status, including transitions between locked and unlocked states for a selection 295. If a player deselects or unlocks a selection 295, the confirmation indicator may be removed or visually altered, and the interface provider 240 can transmit updated rendering instructions to the client device 220 accordingly.

The confirmation tracker 265 can determine which client devices 220 or network profiles 270 that have provided selections 295 for a shared network data record 290 have provided confirmation message(s) corresponding to their selection(s) 295. The confirmation tracker 265 can receive confirmation messages from client devices 220, where each message indicates that a player has locked a selection 295 for a shared network data record 290. The confirmation tracker 265 can associate each received confirmation message with the corresponding network profile 270 and selection 295 by referencing identifiers included in the message payload. The confirmation tracker 265 can update state or data structures to record which selections 295 have been confirmed and which remain pending for each shared network data record 290, for example, by updating the lock settings 267 for the shared network data record 290. The confirmation tracker 265 can monitor for deselection or unlock actions by the same player and can update the confirmation status if a previously confirmed selection 295 is unlocked/unconfirmed. The confirmation tracker 265 can provide output data to other components, such as the interface provider 240, to trigger interface updates reflecting the current confirmation status for each selection 295.

In some implementations, the interface provider 240 can provide an indication of received confirmations of any selections 295 of the shared network data record 290 in the respective application interfaces 285 of the client devices 220 that are members of the shared network data record 290. The interface provider 240 can retrieve confirmation status data for selections 295 from the confirmation tracker 265 or another internal data source. The interface provider 240 can generate and transmit interface update instructions to each client device 220 that is a member of the shared network data record 290. The application interface 285 at each client device 220 can display visual indicators showing which selections 295 have been confirmed and by which network profiles 270. The interface provider 240 can update the interface in real time or near real time as confirmations are received or as selections 295 are locked/unlocked. The interface provider 240 can differentiate between confirmed and unconfirmed selections 295 using visual elements, such as icons, color changes, and/or status banners, among other elements/visual features.

The data processing system 205 can enable players to lock in a wager for a shared network data record 290. The data processing system 205 can provide functionality for players to indicate intent to execute a wager associated with a shared network data record 290 by receiving lock messages from client devices 220 that are members of the shared network data record 290. The lock action can signal the data processing system 205 to execute the shared network data record 290 once confirmation has been received for all selections 295 from their respective providers. The data processing system 205 can monitor the confirmation status of each selection 295 and correlate received lock messages with the relevant shared network data record 290. The data processing system 205 can maintain state information in the lock settings 267 of the shared network data records 290 that links lock messages to specific network profiles 270 and the shared network data records 290. The data processing system 205 can process lock messages as triggers for subsequent execution steps, such as initiating execution/placement of the wager upon satisfaction of confirmation conditions or providing a prompt to the client device 220 that transmitted the lock message to execute the wager.

In some implementations, the interface provider 240 can generate interface elements (e.g., one or more indicators) that visually indicate a lock status or lock action for a shared network data record 290 and transmit or cause presentation of such elements via the application interface 285 of each member client device 220. The application interface 285 can present one or more interactive elements, such as a lock icon or button, that permit a player to initiate a lock message for the shared network data record 290. The indicator may be rendered in association with the shared network data record 290 and may change state based on player interaction and/or receipt of a lock message from the corresponding client device 220. The interface provider 240 can update the application interface 285 in real time or near real time to reflect changes in lock status indicated in the lock settings 267 by transmitting updated rendering instructions and/or state information to the client device(s) 220. The indicator may enable a player to transmit a lock message to the data processing system 205 by interacting with the presented indicator, for example, by selecting or activating the lock icon. The data processing system 205 can receive the lock message and update the lock settings 267 of the shared network data record 290 and/or propagate further state changes to all member client devices 220.

In some implementations, the interface provider 240 can generate a notification in response to receiving a lock message from a client device 220 for a shared network data record 290. The interface provider 240 can transmit the notification to the other client devices 220 associated with the shared network data record 290 by referencing session metadata and/or network profile 270 identifiers of the shared network data record 290. The notification may include information identifying the shared network data record 290, a corresponding network profile 270 of the client device 220, and/or an indication of the lock action performed by the client device 220. The notification can be presented via the application interface 285 at the other client devices 220 to inform each player of the lock status of the network profile 270 and/or a pending execution state. The interface provider 240 can update the application interface 285 in real time or near real time to reflect session state changes triggered by the lock message, such as by rendering a lock status banner or modifying interactive controls. The notification may prompt the other client devices 220 to review or confirm one or more selections 295 to initiate execution/placement of a wager for the shared network data record 290.

In some implementations, the interface provider 240 can provide, to the client device 220 that provided the lock message, a notification indicating that the selections 295 of the shared network data record 290 have all been confirmed. The interface provider 240 can monitor the confirmation status of all selections 295 associated with a shared network data record 290 by querying the confirmation tracker 265 or by retrieving lock settings 267 stored in association with each selection 295. The interface provider 240 can identify client devices 220 that have previously transmitted a lock message for the shared network data record 290 by referencing session metadata or by correlating network profile 270 identifiers with recorded lock actions in the lock settings 267 for the shared network data record 290. Upon determining that all selections 295 have been confirmed, the interface provider 240 can generate a notification or prompt and transmit the notification to each relevant client device 220, for example, those associated with network profiles 270 that have provided a lock message. In some implementations, the notification may include interactive elements or controls that allow the player to review the confirmed selections 295 and proceed with wager placement. The application interfaces 285 can present the notification and confirmed selections 295 to the player at the client device 220, for example, by displaying a summary panel, confirmation dialog, and/or interactive overlay, among other interfaces.

In some implementations, the data record generator 260 can execute the wager for the shared network data record 290 and can generate the association between the network profile 270 and the shared network data record 290 indicating that the wager was placed or executed, in response to a confirmation of the notification sent from the client device 220. The data record generator 260 can receive a confirmation input from the client device 220 in response to the notification provided by the interface provider 240, for example, as a message indicating the player's intent to place the wager. The data record generator 260 can verify that the received confirmation corresponds to the confirmed selections 295 of the shared network data record 290 by comparing the confirmation input with the current state of selections 295 and lock settings 267. The data record generator 260 can execute the wager by generating an association between the network profile 270 of the confirming client device 220 and the shared network data record 290, where the association may include data such as the confirmed selections 295, wager parameters, or a timestamp of execution. The data record generator 260 can store the association in storage 215 and may generate output data or a notification to acknowledge successful wager placement to the client device 220. In some implementations, the acknowledgment may be presented to the player via the application interfaces 285 as a confirmation message, receipt, or status update.

The data record generator 260 can execute or place the wager by generating a wager request payload that encodes the selections 295 stored in the shared network data record 290, the corresponding data structures 280 and parameters 282 such as outcome identifiers, odds values, or wager types, among others, and any player-specific constraints or wager amounts. The data record generator 260 can transmit the wager request payload to a wager backend system using an application programming interface (API) call and/or a suitable network protocol specified by the wager system. The wager backend system can process the wager request and can generate a response that includes a wager confirmation or an error indication, which may include a wager identifier, a placement status, or a timestamp, among others. The data record generator 260 can receive the wager confirmation or error response from the wager backend system and can update the shared network data record 290 to reflect the placement status for the corresponding network profile 270. In some implementations, the data record generator 260 can store the wager confirmation in association with the network profile 270 and the selections 295 and/or can provide a notification to the client device 220 indicating successful placement or rejection of the wager. The application interface 285 can present an updated status or receipt for the wager, including the finalized odds, wager amount, or confirmation identifier, among others.

In some implementations, the data record generator 260 can receive lock messages from client devices 220, where each lock message indicates a player's intent to automatically execute a wager for the corresponding shared network data record 290. The data record generator 260 can monitor the lock settings 267 to determine that all required confirmations have been received for the selections 295 associated with the shared network data record 290. The data record generator 260 can identify a wager amount or other wager parameter specified by the player in association with the lock message. The data record generator 260 can automatically generate a wager execution request that encodes the current selections 295, the wager parameters, or the association to the relevant network profile 270. The data record generator 260 can transmit the wager execution request to a wager backend or settlement system for processing. The data record generator 260 can store or update an execution status in association with the shared network data record 290 to reflect the outcome of the wager execution request.

The data record generator 260 can monitor for confirmation signals or lock messages from client devices 220 participating in the shared network data record 290. Upon receipt of the required confirmations, the data record generator 260 can generate an association record that links the shared network data record 290 to the network profile 270 of the client device 220 that transmitted the lock message. The association may include metadata such as the time of execution, a wager amount, selections 295, or any relevant parameters. The data record generator 260 can store the association in storage 215, and the association may be referenced for settlement or user interface updates, among others. In some implementations, the data record generator 260 may transmit a confirmation or status update to the client device 220 indicating successful execution or placement of the wager. The data record generator 260 can generate, responsive to the confirmations, and based on the lock message, an association between the shared network data record 290 and a network profile 270 of the client device 220 that provided the lock message.

Figure 3A:
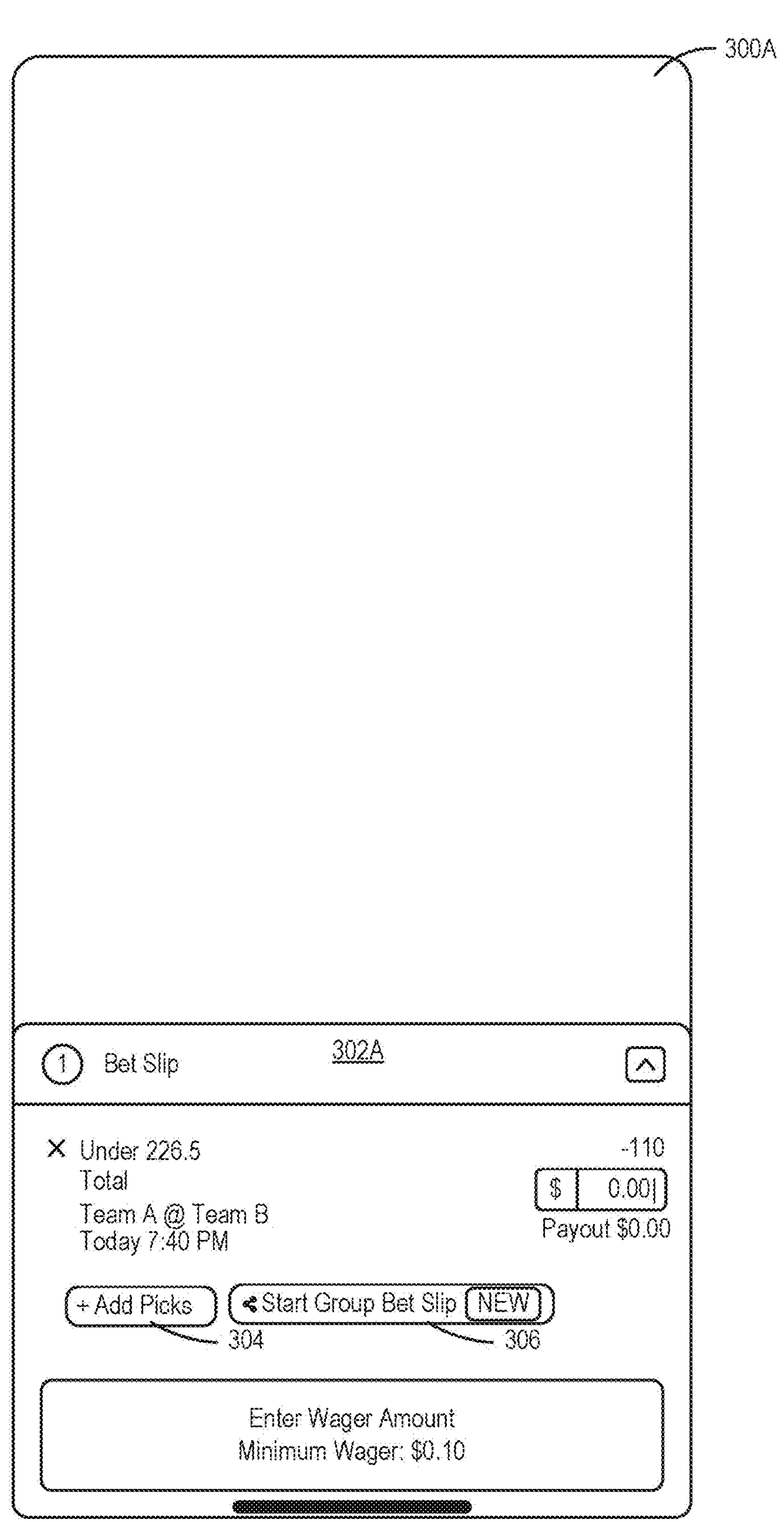
FIG. 3A is a diagram illustrating a graphical user interface for initiating a shared network data record, in accordance with one or more implementations.
Figure 3B:
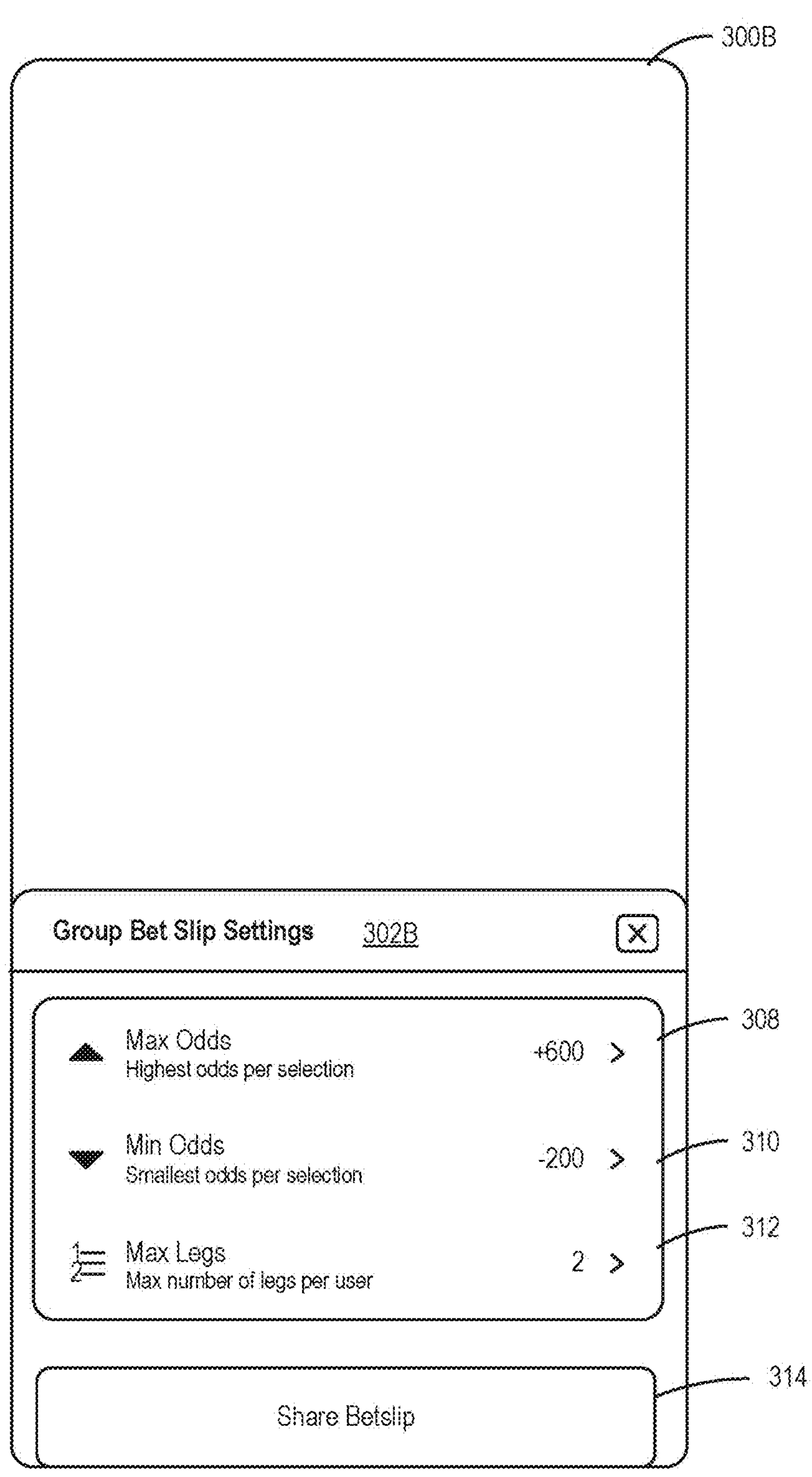
FIG. 3B is a diagram illustrating a graphical user interface for configuring a shared network data record, in accordance with one or more implementations.

Referring now to FIGS. 3A-3H, illustrated are various graphical user interfaces 300A-300H that may be presented via one or more client devices (e.g., client devices 220) according to the techniques described herein. The graphical user interfaces 300A-300H may be presented, for example, via one or more applications executing on the client devices or other computing devices described herein. The graphical user interfaces may be presented via web-based interfaces, thin-client interfaces, or any other type of application that can present graphical elements. In some implementations, the graphical user interfaces 300A-300H may be or include nay of the application interfaces 285 of FIG. 2, as described herein. FIG. 3A illustrates a diagram of a graphical user interface 300A for initiating a shared network data record, in accordance with one or more implementations.

The graphical user interface 300A can present an overlay region 302A that occupies a portion of a display of a client device. The overlay region 302A may be presented over an application region, which may be used to generate wager selections (e.g., selections 295 of wager opportunities/data structures 280 and/or corresponding parameters 282) for inclusion in the shared network data records 290 described in connection with FIG. 2. The overlay region 302A, in this example, can display information relating to an individual (e.g., not shared) bet slip, such as wager opportunities, outcome identifiers, and/or wager parameters, among others. The overlay region 302A can include a first button 304 and a second button 306, each of which can be actionable objects selectable by a user via a touch screen or other input device. The first button 304 can permit a user to add picks/selections to the individual bet slip.

The second button 306 can permit a user to initiate a process for constructing a shared network data record (e.g., a shared network data record 290, shared bet slip). In some implementations, activation of the second button 306 can prompt presentation of additional configuration options or invitation interfaces for selecting other participants. The overlay region 302A can display current selections, such as a wager on a sporting event, a wager amount entry field, or a payout calculation, among others. The graphical user interface 300A can present the overlay region 302A as an interactive panel that overlays an existing application interface, such as a sports-betting application or a gaming application, among others. In some implementations, the overlay region 302A can dynamically update in response to user selections, additions, or removals of wager opportunities or data structures.

The graphical user interface 300B can present an overlay region 302B (e.g., an application interface 285) for modifying/setting configuration settings of a shared network data record, for example, in response to pressing the second button 306 shown in FIG. 3A. The overlay region 302B can display configuration any number of configuration setting regions, which in this example includes a first configuration setting region 308, a second configuration setting region 310, and a third configuration setting region 312. The first configuration setting region 308 can present an interface element for specifying a maximum odds value per selection, where the maximum odds value may be displayed as a numerical threshold, for example, "+600." The second configuration setting region 310 can present an interface element for specifying a minimum odds value per selection, where the minimum odds value may be displayed as a numerical threshold, for example, "−200." The third configuration setting region 312 can present an interface element for specifying a maximum number of selections (e.g., parlay legs) for the shared network data record, where the maximum number may be displayed as a numerical value, which in this example is two.

The overlay region 302B can present a share button 314 for initiating the sharing of (e.g., inviting others to join) the shared network data record. In some implementations, the share button 314 may be selectable to transmit a request for sharing the shared network data record with one or more additional client devices or network profiles, as described herein. The configuration setting regions 308, 310, or 312 may be interactive, permitting a user to select or modify the respective configuration parameters prior to sharing. The graphical user interface 300B can update the displayed values in the configuration setting regions 308, 310, or 312 in response to user input or system-defined constraints. In some implementations, the overlay region 302B may display additional interface elements for closing the configuration interface or for providing contextual information regarding the shared network data record, among others.

Figure 3C:
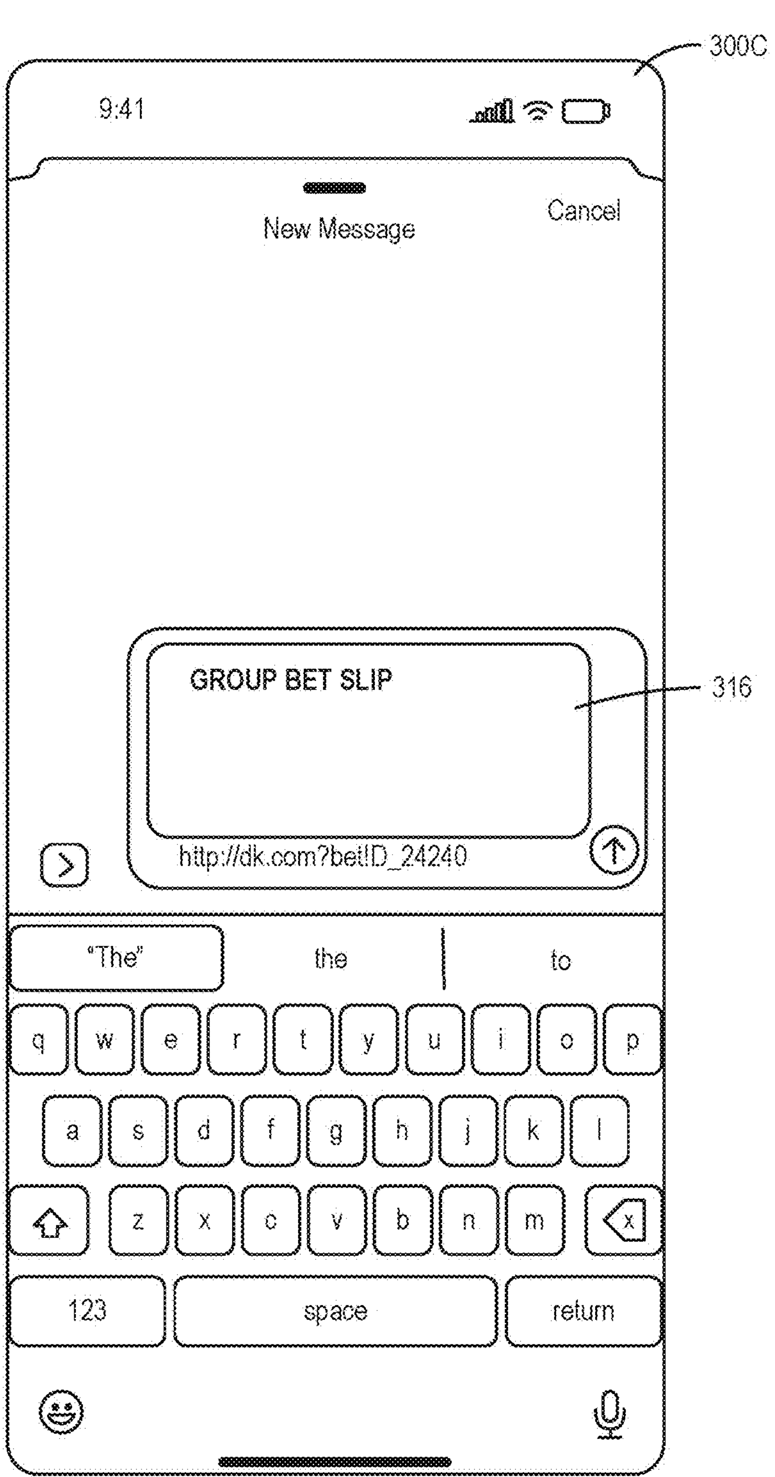
FIG. 3C is a diagram illustrating a graphical user interface for sharing a shared network data record via a network message, in accordance with one or more implementations.

FIG. 3C illustrates a diagram of a graphical user interface 300C for sharing a shared network data record via a network message, in accordance with one or more implementations. The graphical user interface 300C can present a shared network data record message 316 within a messaging application interface (e.g., a text messaging interface), where the shared network data record message 316 can include a hyperlink and/or identifier corresponding to a shared network data record. In some implementations, the shared network data record message 316 can encode a URL/URI or other network-accessible reference that, when selected, may prompt a recipient device to access or join the corresponding shared network data record session using a corresponding network profile. Other sharing techniques are also possible, for example, sharing via email, via social media platforms messages, and/or via profile-to-profile sharing facilitated by the data processing system 205 of FIG. 2, among others.

Figure 3D:
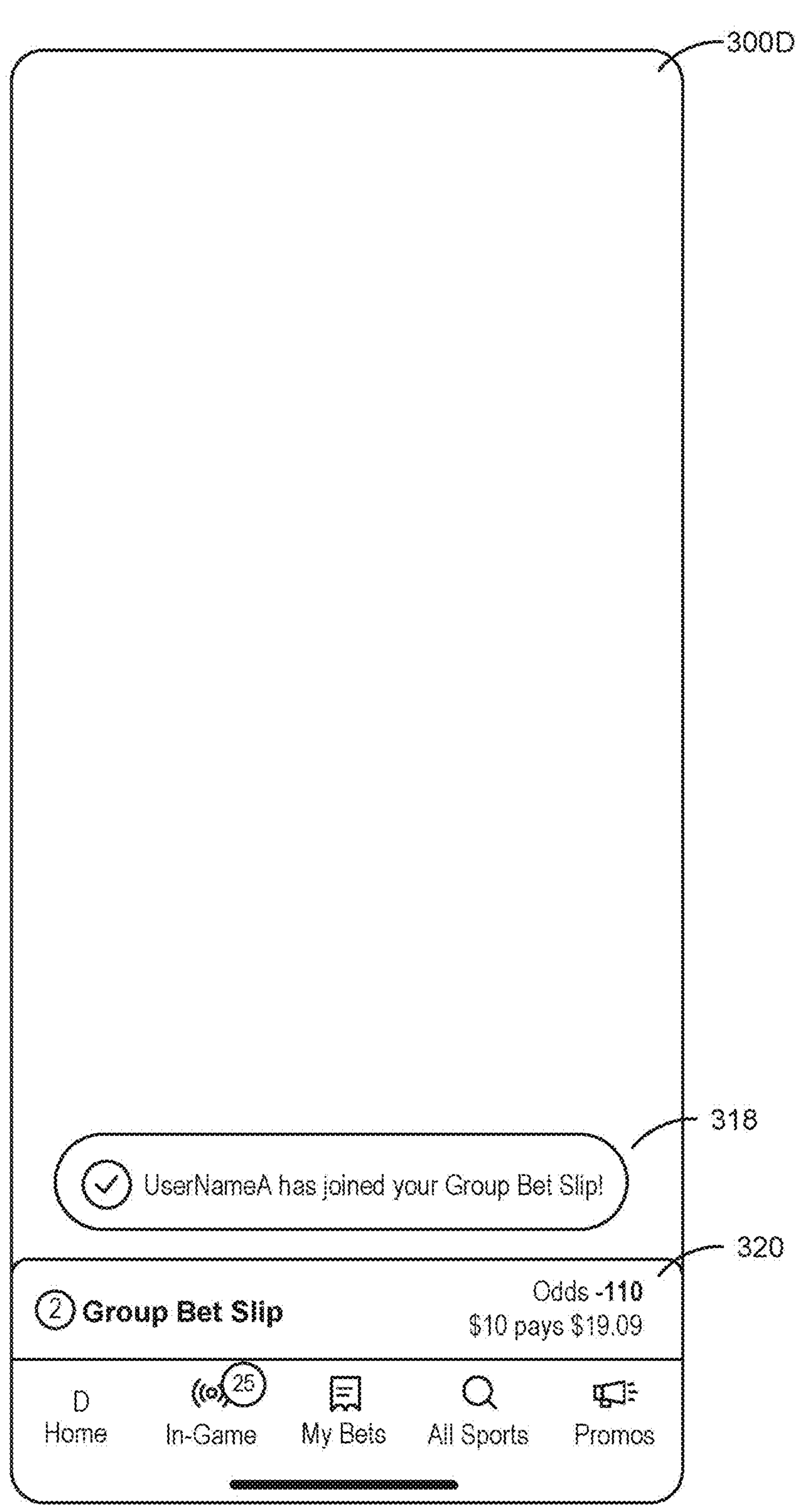
FIG. 3D is a diagram illustrating a graphical user interface showing a notification that a client device has accessed a shared network data record, in accordance with one or more implementations.

FIG. 3D illustrates a diagram of a graphical user interface 300D showing a notification 318 that a client device has accessed a shared network data record, in accordance with one or more implementations. The graphical user interface 300D can include a collapsed overlay region 320 disposed along a lower portion of a display area, where the collapsed overlay region 320 can present summary information relating to the shared network data record being generated. The notification 318 can be displayed within the graphical user interface 300D as a visual indicator, for example, by presenting a message that a user has joined and/or been invited to join the shared network data record. In some implementations, the notification 318 can be rendered as a banner, pop-up element, notification, or any other type of indicator. The graphical user interface 300D can update in real time or near real time to reflect changes in membership and/or access events for the shared network data record.

Figure 3E:
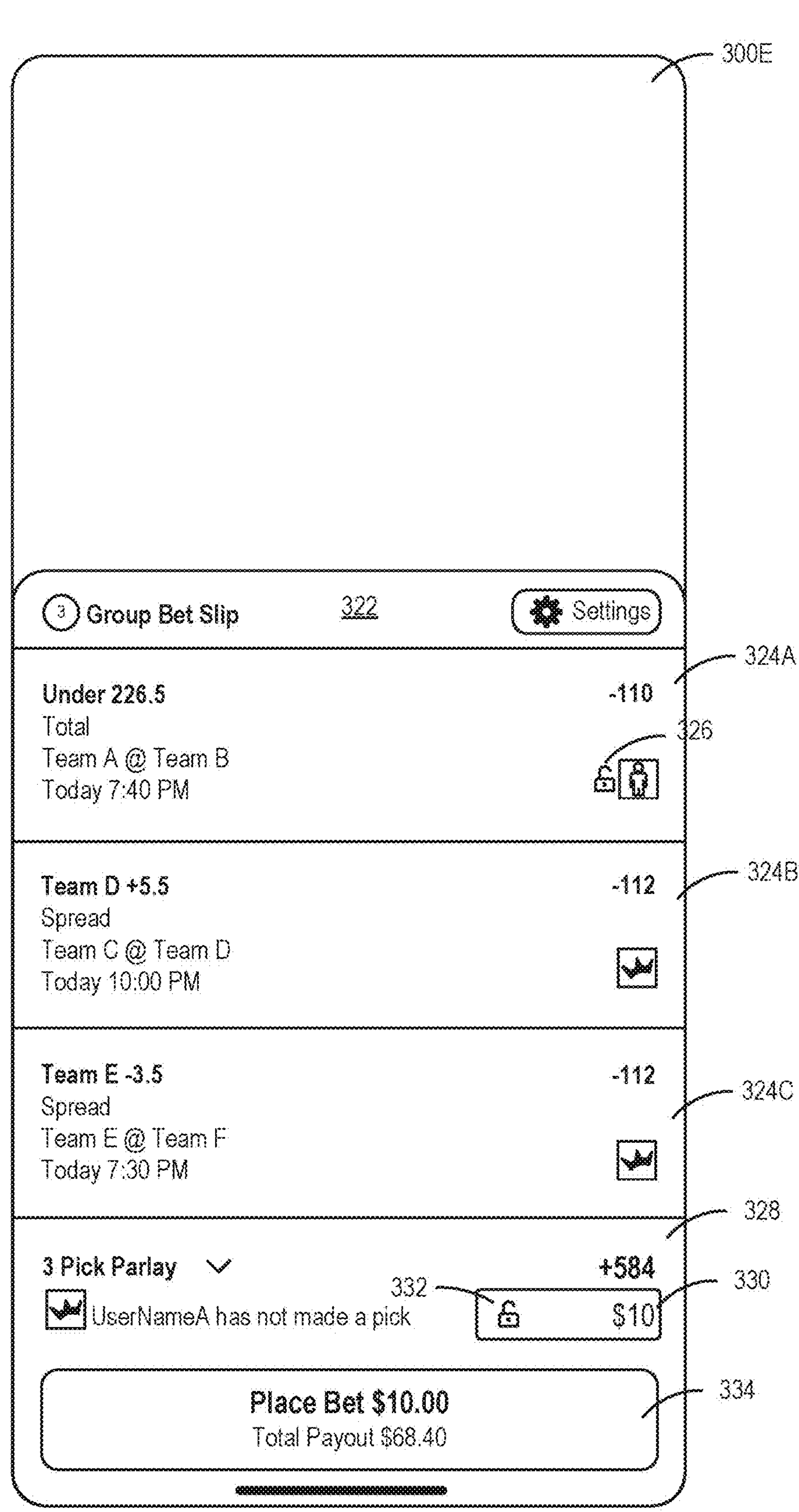
FIG. 3E is a diagram illustrating a graphical user interface for updating a shared network data record, in accordance with one or more implementations.

FIG. 3E illustrates a diagram of a graphical user interface 300E for updating a shared network data record, in accordance with one or more implementations. The graphical user interface 300E can include an overlay region 322 (e.g., application interface 285) that presents information relating to the shared network data record created through the operations shown in connection with FIGS. 3A-3D. In this example, the shared network data record can be generated from a personal bet slip shown in FIG. 3A, and as such the selection (e.g., selection 295) of the owner/creator has been pre-populated in the shared network data record as shown in the first data structure region 324A. The first data structure region 324A can display information corresponding to the owner's selection, in this example showing an outcome identifier, time information, live event information, and/or associated event parameters, among others. The lock icon 326 disposed adjacent to the first data structure region 324A can indicate an unlocked state, which can signify that the selection has not yet been confirmed by the owner/creator of the shared network data record.

The graphical user interface 300E, in this example, includes a second data structure region 324B and a third data structure region 324C, each of which can correspond to selections contributed by other member network profiles of the shared network data record. In this example, the shared network data record corresponds to a parlay wager. As odds for each leg of the parlay wager change, the display of the shared network data record can be updated in real time or near real time to indicated the updated odds. The second data structure region 324B and the third data structure region 324C can display information related to the respective selections of additional participants, such as outcomes, live event information, odds, and time information.

In some implementations, the first data structure region 324A, the second data structure region 324B, and the third data structure region 324C can each present a selectable area that permits removal of a corresponding selection by detecting a swipe interaction on the respective region. In some implementations, a client device can determine whether a swipe gesture is received on one of the data structure regions 324A, 324B, or 324C, and can generate a removal request for the selection associated with that region only if the network profile of the player initiating the swipe interaction matches the attribution for the selection. During the swipe interaction, the corresponding region may slide or otherwise change visually to indicate that further interaction can cause the corresponding selection to be removed.

In some implementations, the client device can transmit a removal request to the data processing system 205, which can determine whether the requesting network profile is permitted to remove the selection, and can update the shared network data record to reflect the removal. Other interaction types may also be used to remove selection(s) from the shared network data record. In some implementations, an owner of the shared network data record can remove any of the selections in the shared network data record by performing a swipe interaction on any of the data structure regions 324A, 324B, or 324C, regardless of attribution. In some implementations, players may only be able to remove their own selections from the shared network data record. In some implementations, owners/creators of shared network data records may be able to remove any of the selections, while other members may only be able to remove their own selections.

The data record summary region 328 can present the total odds of the shared network data record (in this example, as it is a parlay wager, the odds are determined according to the odds of each selection and a corresponding odds function), and a data record value field 330. The data record value field 330 can receive a wager amount for the player to place when executing the shared network data record. In this example, the wager is $10. The data record lock element 332 can indicate an unlocked state, which can indicate that the wager/wager amount for the shared network data record has not been locked by the current player. The button 334 can permit the player to initiate placement of the wager for the shared network data record, regardless of whether the other selections have yet been confirmed.

Figure 3F:
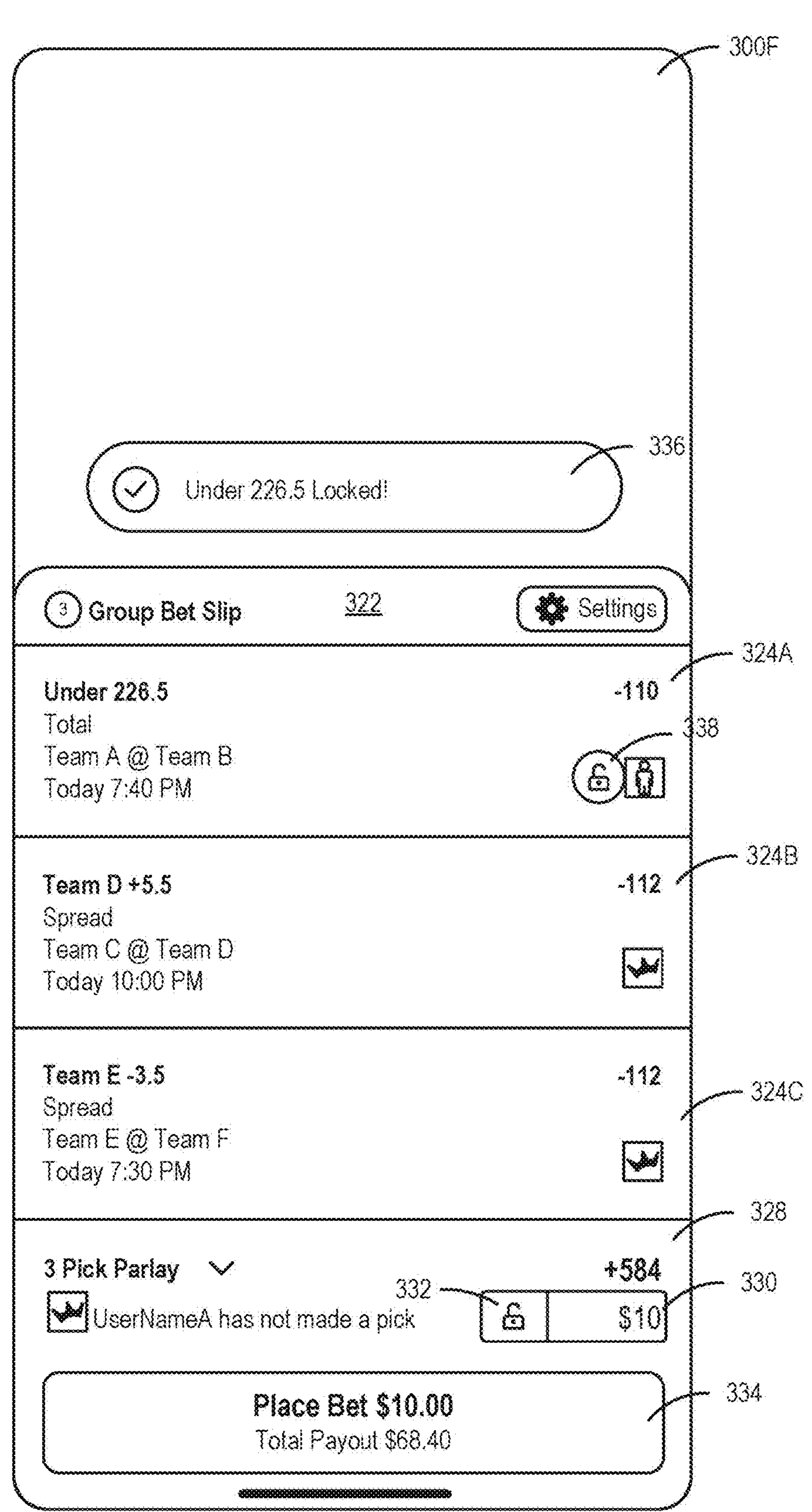
FIG. 3F is a diagram illustrating a graphical user interface for updating a shared network data record, following a confirmation message for a selection of the shared network data record, in accordance with one or more implementations.

FIG. 3F illustrates a diagram of a graphical user interface 300F for updating a shared network data record, following a confirmation message for a selection of the shared network data record. The graphical user interface 300F can present the overlay region 322, with the first data structure region 324A having been updated to display the updated lock icon 338, following an interaction by the player. The updated lock notification 336 can be presented in association with the overlay region 322 to provide a visual indication that the selection in first data structure region 324A has been confirmed by the player. The second data structure region 324B, the third data structure region 324C, the data record summary region 328, the data record value region 330, the data record lock element 332, and the button 334 can be presented in a manner similar to graphical user interface 300E of FIG. 3E, as shown.

Figure 3G:
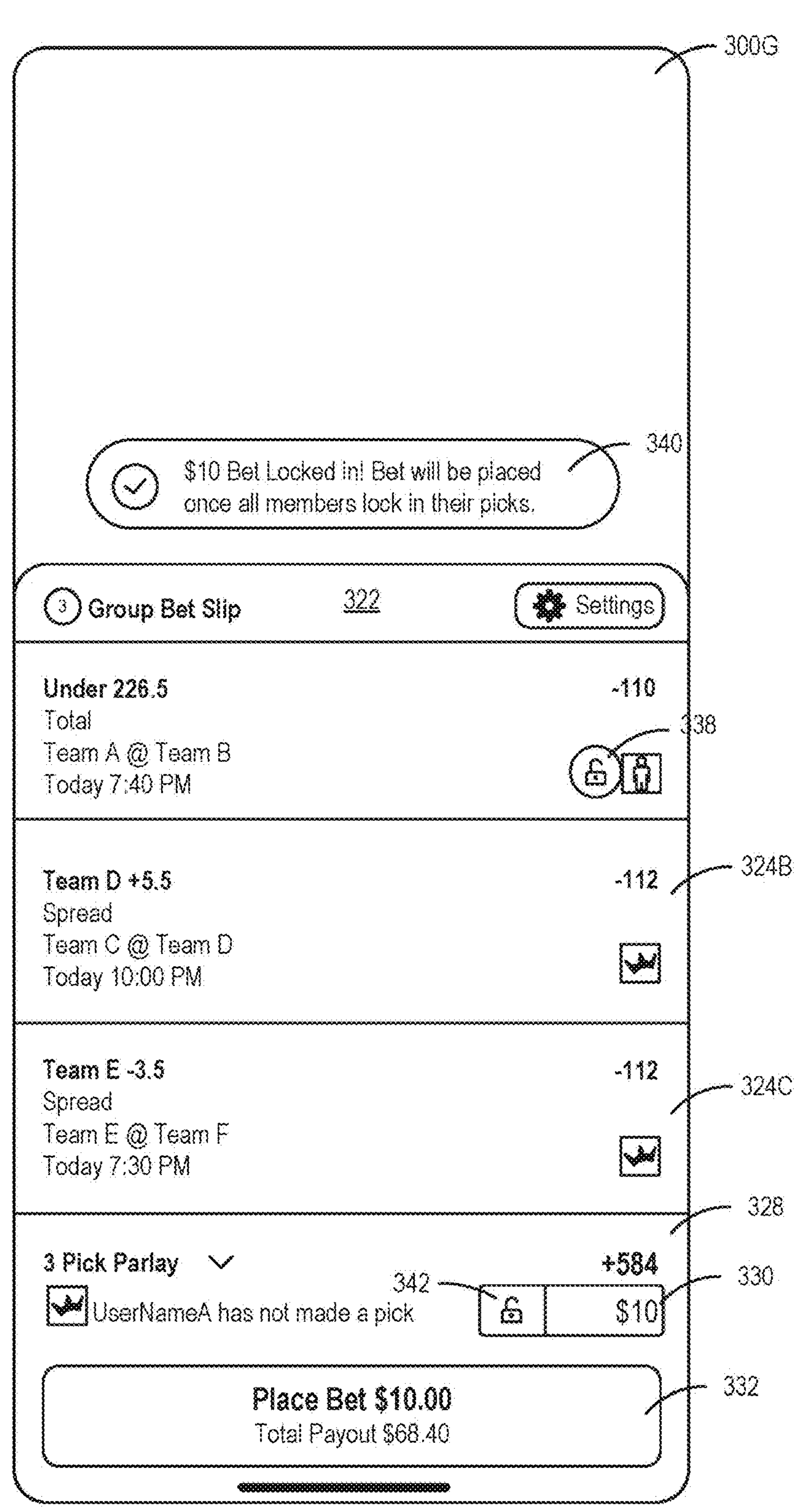
FIG. 3G is a diagram illustrating a graphical user interface for updating a shared network data record, following a lock message for executing the shared network data record, in accordance with one or more implementations.

FIG. 3G illustrates a diagram of a graphical user interface 300G for updating a shared network data record, following a lock message for executing the shared network data record. The graphical user interface 300G can present the overlay region 322 with the data record summary region 328 having been updated to display the updated data record lock element 342, which can indicate that the player's wager for the shared network data record has been locked, as described herein. The graphical user interface 300G can further include a second data structure region 324B, a third data structure region 324C, a data record value region 330, a data record lock element 332, or an updated lock icon 338, among others. The graphical user interface 300G can present a notification 340, which may be displayed as a banner or pop-up in association with the overlay region 322, to indicate that the wager has been locked and will be placed once all members lock in/confirm their picks/selections. In some implementations, the notification 340 can include text identifying the wager amount and a status message indicating that placement is pending confirmation from all participants.

Figure 3H:
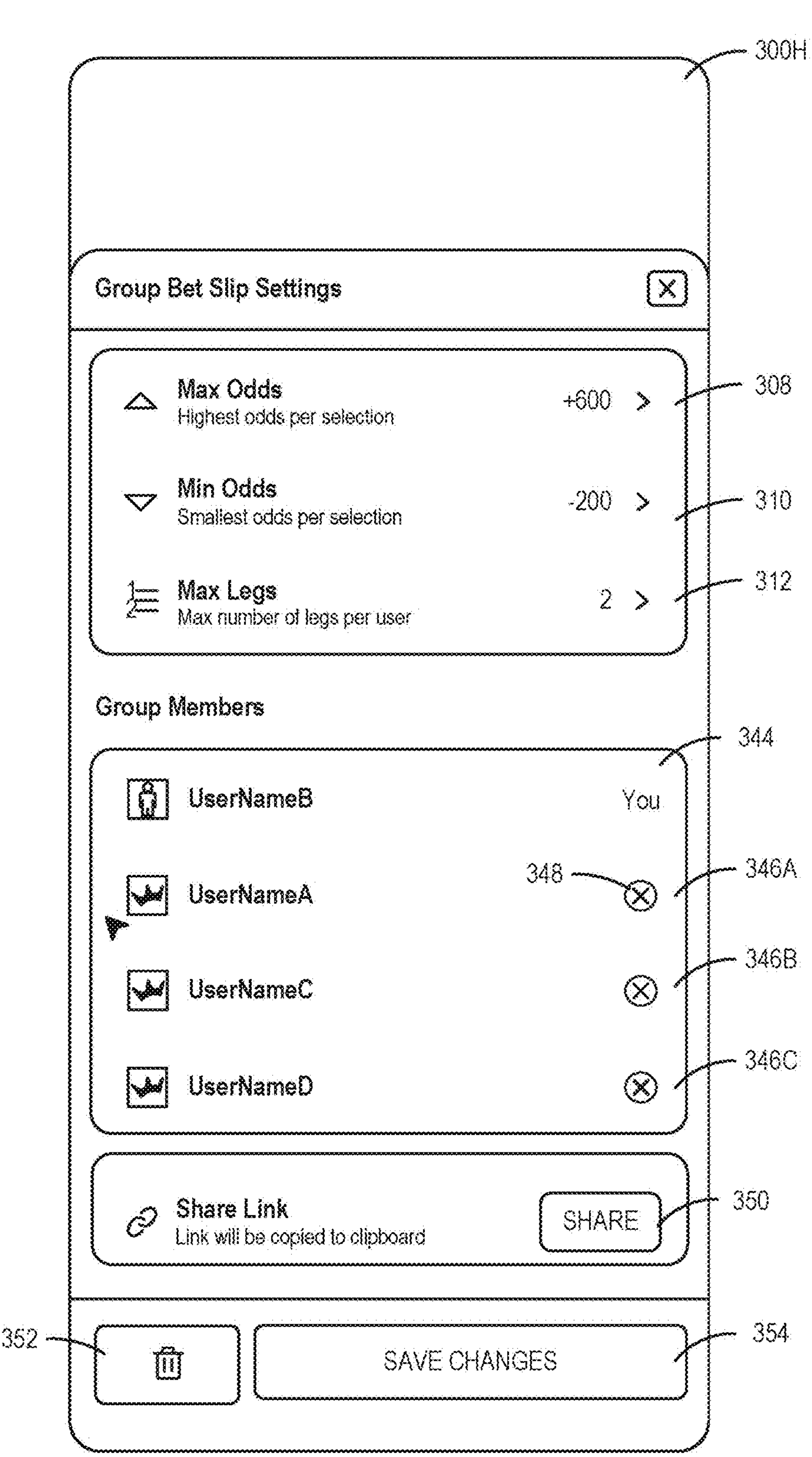
FIG. 3H is a diagram illustrating a graphical user interface for modifying configuration settings of a shared network data record, in accordance with one or more implementations.

FIG. 3H illustrates a diagram of a graphical user interface 300H for modifying configuration settings of a shared network data record. The graphical user interface 300H may be presented in response to an interaction with the settings button shown in the overlay 322 of FIGS. 3E-3G. The graphical user interface 300H can include the first configuration setting region 308, the second configuration setting region 310, and the third configuration setting region 312, similar to those described in connection with FIG. 3B. In some implementations, the graphical user interface 300H can permit a user to modify one or more of the configuration settings presented in the first configuration setting region 308, the second configuration setting region 310, or the third configuration setting region 312 via corresponding interactions. Updates to the configuration settings can be applied to the shared network data record and/or the selections thereof (e.g., to re-evaluate whether selections are valid in response to modified configuration settings).

The graphical user interface 300H can show a list of members for the shared network data record, shown here as including an owner network profile region 344, a first member network profile region 346A, a second member network profile region 346B, and a third member network profile region 346C. The owner network profile region 344 can display information identifying the owner of the shared network data record, and in this example includes a username or profile image. The first member network profile region 346A, the second member network profile region 346B, or the third member network profile region 346C can each display information identifying additional members of the shared network data record.

A respective remove profile button 348 can be presented adjacent to each of the member network profile regions 346A-346C, such that the owner may remove a corresponding member from the shared network data record. Selections (e.g., selections 295) previously made by members that are removed via the remove profile button 348 can also be automatically removed from the shared network data record. The share button 350 can permit the owner to generate or transmit a shareable link for the shared network data record. The delete button 352 can permit deletion of the shared network data record, and the save button 354 can permit saving of any modifications to the configuration settings and/or membership.

Saving may automatically update the configuration settings, and may cause the system maintaining the shared network data record (e.g., the data processing system 205) to re-evaluate each of the selections (if any) against the restrictions of the updated configuration settings. Selections that no longer satisfy the restriction(s) and/or the shared network data record itself may be flagged with one or more visual indicators to indicate the selection(s) that do not satisfy the restrictions. In some implementations, execution of the shared network data record may be restricted until all selections satisfy the restrictions imposed via the configuration settings of the shared network data record.

Figure 4:
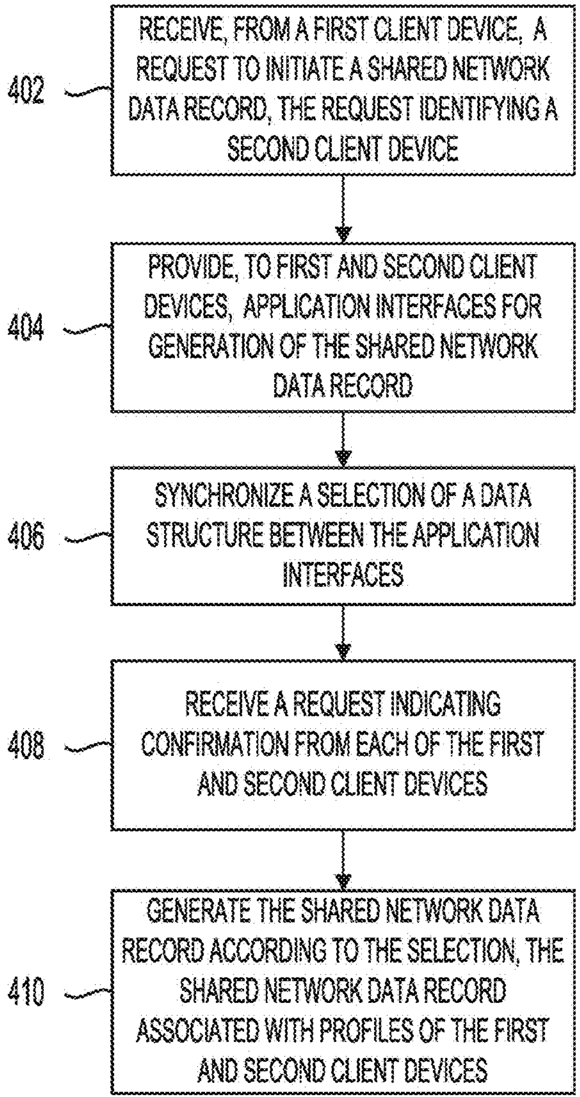
FIG. 4 is a flow chart illustrating a method for modifying network data records using multiple devices, in accordance with one or more implementations.

Referring now to FIG. 4, illustrated is a method 400 of modifying network data records using multiple devices. The method 400 may be performed, for example, by any of the computing devices described herein. In one example, the data processing system 205 of FIG. 2 may be used to perform some or all of the acts of the method 400. In brief overview of the method 400, the method 400 can include receiving, from a first client device, a request to initiate a shared network data record, the request identifying a second client device (ACT 402), providing, to first and second client devices, application interfaces for generation of the shared network data record (ACT 404), synchronizing a selection of a data structure between the application interfaces (ACT 406), receiving a request indicating confirmation from each of the first and second client devices (ACT 408), and generating the shared network data record according to the selection, the shared network data record associated with profiles of the first and second client devices (ACT 410).

The method 400, at ACT 402, can include receiving, from a first client device (e.g., a client device 220), a request to initiate a shared network data record (e.g., a shared network data record 290), the request identifying a second client device. For example, a data processing system (e.g., the data processing system 205) can receive a request from a first client device to initiate a shared network data record, where the request can specify an identifier for a second client device to be included in the session. The request can include configuration settings for the shared network data record, such as a maximum or minimum odds value, a maximum number of selections, or one or more categories for data structures to be included in the shared network data record, among others. In some implementations, the data processing system can determine whether the first client device is associated with a valid player profile and can store an association between the request and the identified second client device. The data processing system can generate a session token or admission credential for the second client device and can record the device identity in an allowed players list to enable subsequent reentry or continuity of the session.

In some implementations, the data processing system can provide dual invitation paths for session admission, such as by generating a shareable link for remote access or by detecting local proximity using Bluetooth discovery. Upon acceptance of the invitation, the data processing system can issue a non-Bluetooth token to the second client device, which can permit automatic reentry to the session after a transient disconnect without requiring repeated manual approval. The data processing system can enforce restrictions specified in the configuration settings, such as a threshold number of allowed members, a range of values for parameters of the shared network data record, or a list of permitted or blocked outcome types. In some implementations, the data processing system can generate a notification for the second client device identifying the request to initiate the shared network data record and can monitor for a confirmation message to initiate the session.

The method 400, at ACT 404, can include providing, to first and second client devices, application interfaces for generation of the shared network data record. The data processing system can generate and transmit application interface definitions to each of the first and second client devices, where the application interfaces can present interactive controls for constructing or modifying the shared network data record. The application interfaces can be presented as overlays for graphical user interfaces of applications executing on the client devices, such as a sports-betting application, and can include actionable objects for selecting data structures, configuring parameters, or sharing the session with additional participants. In some implementations, the application interfaces can display configuration setting regions, such as input fields for specifying maximum odds, minimum odds, or a maximum number of selections per player. The data processing system can update the application interfaces in real time or near real time to reflect changes in session state, configuration settings, or membership.

In some implementations, the data processing system can determine which application interface elements to provide based on the session role of each player, such as administrator, participant, or guest, and can enforce role-based permissions and guardrails for collaborative modification of the shared network data record. The application interfaces can present visual indicators for attribution, such as avatar or crown markers identifying which player added each selection, and can reflect provenance for each selection in the shared network data record. In some implementations, the data processing system can transmit incremental or full interface updates to the client devices using real-time communication protocols, such as WebSocket connections, and can store a record of transmitted interface definitions to enable interface consistency or catchup after a disconnect.

The method 400, at ACT 406, can include synchronizing a selection of a data structure between the application interfaces. The data processing system can receive a selection of a data structure (e.g., the selections 295) from a client device and can update the shared network data record to reflect the new or modified selection. The data processing system can generate a synchronization message or update instruction that encodes the identifier of the selected data structure, the attribution of the player who made the selection, and any relevant configuration parameters, and can transmit the synchronization message to each client device participating in the session. In some implementations, the data processing system can determine whether the selection satisfies at least one restriction identified in the configuration settings, such as a range of values for a parameter, a category for data structures to be included, or a threshold number of data structures to be included in the shared network data record. The data processing system can store the updated state of the shared network data record in a memory (e.g., storage 215) and can propagate state changes to all participating client devices using real-time communication protocols.

In some implementations, the data processing system can process concurrent or conflicting selection updates by applying a conflict resolution policy, such as last-write-wins or administrator override, among others. The application interfaces at each client device can receive and parse the transmitted synchronization data to render or update the presentation of the selections currently included in the shared network data record. The data processing system can present visual differentiation of market board selections, such as a solid fill for self-selections and an outlined or transparent style for selections made by other players, to clarify authorship and selection status. In some implementations, the data processing system can store a log of selection updates to enable history replay or catchup for client devices that reconnect after a gap.

The method 400, at ACT 408, can include receiving a request indicating confirmation from each of the first and second client devices. The data processing system can receive confirmation messages from the client devices, where each confirmation can indicate that a player has finalized or locked a selection for the shared network data record. The data processing system can update a confirmation status field for each selection and can monitor the lock status of all selections associated with the shared network data record. In some implementations, the data processing system can provide dual lock mechanisms, such as a per-leg lock for individual selections and a per-wager auto-lock for automatic placement of a wager once all participants' selections are locked, subject to constraints such as minimum or maximum parlay odds. The data processing system can enforce compliance and risk controls for auto-placement by constraining execution with min/max odds or other parameters to prevent unacceptable risk escalations.

In some implementations, the data processing system can generate notifications or interface updates for the client devices based on changes to confirmation status, such as by indicating which selections have been confirmed and by which players. The application interfaces can present interactive indicators for lock status, such as lock icons or status banners, and can display attribution for each confirmed selection. In some implementations, the data processing system can record the accepted price per player for each selection, allowing for divergence in odds due to timing of acceptance, and can store the confirmation status and odds values in association with the player profiles of the client devices.

The method 400, at ACT 410, can include generating the shared network data record according to the selection, the shared network data record associated with profiles of the first and second client devices. The data processing system can generate a shared network data record that encodes the current selections, player attributions, confirmation statuses, and any relevant configuration parameters. The shared network data record can be associated with player profiles (e.g., the network profiles 270) corresponding to the first and second client devices and can store associations between each profile and the selections or parameters contributed by that player. In some implementations, the data processing system can generate a wager request payload that encodes the selections stored in the shared network data record, the corresponding data structures and parameters, and any player-specific constraints or wager amounts, and can transmit the wager request payload to a wager backend system for processing.

In some implementations, the data processing system can store the generated shared network data record in persistent storage and can transmit a confirmation message to the client devices indicating successful generation. The data processing system can update the application interfaces to reflect the final state of the shared network data record, such as by displaying a summary panel, confirmation dialog, or interactive overlay. In some implementations, the data processing system can enable personal fork or localization of a shared slip by permitting a participant to leave the session while retaining the current set of outcome identifiers as a personal bet slip, where subsequent edits affect only the personal bet slip.

Figure 5:
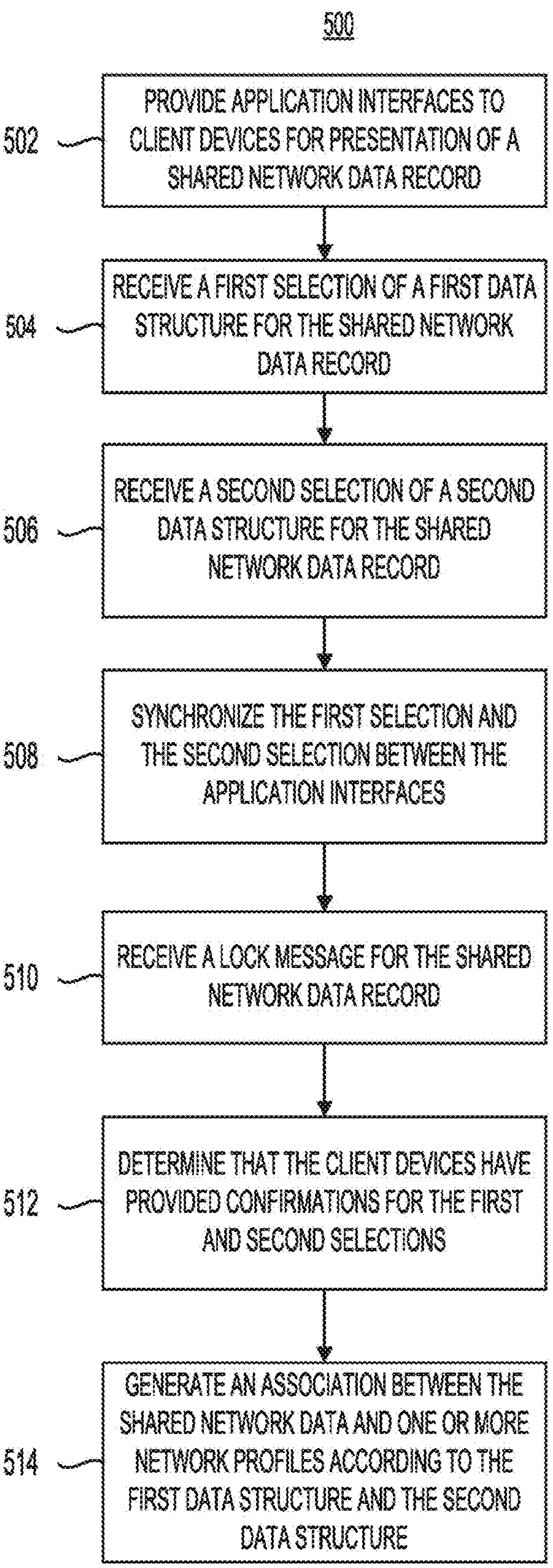
FIG. 5 is a flow chart illustrating a method for executing network data records according to lock messages, in accordance with one or more implementations.

Referring now to FIG. 5, illustrated is a method 500 of executing network data records according to lock messages. The method 500 may be performed, for example, by any of the computing devices described herein. In one example, the data processing system 205 of FIG. 2 may be used to perform some or all of the acts of the method 500. In brief overview of the method 500, the method 500 can include providing application interfaces to client devices for presentation of a shared network data record (ACT 502), receiving a first selection of a first data structure for the shared network data record (ACT 504), receiving a second selection of a second data structure for the shared network data record (ACT 506), synchronizing the first selection and the second selection between the application interfaces (ACT 508), receiving a lock message for the shared network data record (ACT 510), determining that the client devices have provided confirmations for the first and second selections (ACT 512), and generating an association between the shared network data and one or more network profiles according to the first data structure and the second data structure (ACT 514).

The method 500, at ACT 502, can include providing application interfaces (e.g., application interfaces 285) to client devices (e.g., client devices 220) for presentation of a shared network data record (e.g., a shared network data record 290). A data processing system (e.g., the data processing system 205) can generate one or more application interfaces for presentation at each client device participating in a shared session. To do so, any of the operations described in connection with FIG. 2 can be performed. The application interfaces can present a collaborative bet slip panel, which may display selectable regions for wager opportunities, outcome identifiers, wager parameters, and/or attribution markers, among other user interface elements described herein. In some implementations, the application interfaces can present overlays for graphical user interfaces of applications executing on the client devices, such as sports-betting applications or gaming applications, as described herein. In one example, the data processing system can transmit serialized interface definitions or update instructions to the client devices, where the transmitted data can specify layout, content, interactive controls, or state information for the shared network data record. The application interfaces can include visual indicators for lock status, confirmation status, and/or provenance, and may present actionable objects such as buttons, toggles, or list items for player interaction. In some implementations, the data processing system can determine which interface elements to provide based on session role, permissions, configuration settings, and/or device capabilities, as described herein.

In some implementations, the application interfaces can include access control lists, role-based visibility flags, or encrypted portions that restrict access to certain interface elements and/or features. The data processing system can retrieve interface templates or definitions from memory and populate the templates with session-specific metadata, such as participant identifiers, configuration parameters, or current session state. The data processing system can transmit the generated application interface data to each client device via a network connection, such as a WebSocket session or a hypertext transfer protocol response. The application interfaces can present real-time or near real-time updates reflecting changes in the shared network data record, such as additions or removals of selections, modifications to configuration settings, and/or changes in lock status. In some implementations, the data processing system can store a record of transmitted interface definitions or update instructions to enable interface consistency or to facilitate recovery after a transient disconnect. The data processing system can monitor acknowledgments from the client devices to confirm successful presentation of the application interfaces.

The method 500, at ACT 504, can include receiving a first selection (e.g., a selection 295) of a first data structure (e.g., a data structure 280) for the shared network data record. The data processing system can receive a selection input from a client device, where the input can identify a data structure to be included in the shared network data record. The selection input can include a selection identifier, a participant attribution, a timestamp, or one or more configuration parameters, among others. The data processing system can parse the received selection input to extract the identifier of the data structure and any associated metadata. In some implementations, the data processing system can update the shared network data record to reflect the new or modified selection by storing the identifier of the data structure, updating participant attribution, and/or storing the timestamp in association with the shared network data record. The data processing system can generate a synchronization message or update instruction that encodes the identifier, attribution, timestamp, and/or relevant configuration parameters, and can transmit the synchronization message to each client device participating in the shared session.

In some implementations, the data processing system can determine whether the received selection satisfies at least one restriction associated with the shared network data record. The data processing system can retrieve configuration settings from memory that specify restrictions on selections, such as minimum or maximum odds values, permitted or blocked categories, or a threshold number of data structures to be included in the shared network data record, among others. The data processing system can compare the received selection against the identified restrictions by evaluating parameters such as odds limits, allowed categories, or participant-specific constraints. If the selection violates a restriction, the data processing system can generate an error notification or trigger a request for participant modification. In some implementations, the data processing system can update the shared network data record to include the first data structure only if the selection complies with each restriction. The data processing system can transmit feedback or a notification to the relevant client device or application interface, where the feedback may include an error message, a warning, or an indication of the restriction that was not satisfied.

The method 500, at ACT 506, can include receiving a second selection of a second data structure for the shared network data record. The data processing system can receive a selection input from a second client device, where the input can identify a second data structure for inclusion in the shared network data record. The selection input can include a selection identifier, participant attribution, timestamp, or configuration parameters, among others. The data processing system can parse the received selection input to extract the identifier of the second data structure and any associated metadata. In some implementations, the data processing system can update the shared network data record to reflect the new or modified second selection by storing the identifier, updating participant attribution, and/or storing the timestamp in association with the shared network data record. The data processing system can generate a synchronization message or update instruction that encodes the identifier, attribution, timestamp, and/or relevant configuration parameters, and can transmit the synchronization message to each client device participating in the shared session.

In some implementations, the data processing system can determine whether the second selection satisfies at least one restriction associated with the shared network data record. The data processing system can retrieve configuration settings from memory that specify restrictions on selections, such as minimum or maximum odds values, permitted or blocked categories, or a threshold number of data structures to be included in the shared network data record, among others. The data processing system can compare the second selection against the identified restrictions by evaluating parameters such as odds limits, allowed categories, or participant-specific constraints. If the second selection violates a restriction, the data processing system can generate an error notification or trigger a request for participant modification. In some implementations, the data processing system can update the shared network data record to include the second data structure only if the selection complies with each restriction. The data processing system can transmit feedback or a notification to the relevant client device or application interface, where the feedback may include an error message, a warning, or an indication of the restriction that was not satisfied.

The method 500, at ACT 508, can include synchronizing the first selection and the second selection between the application interfaces. The data processing system can generate and transmit synchronization messages or update instructions to each client device participating in the shared session, where the messages can encode the identifiers, participant attributions, timestamps, or configuration parameters for the first and second selections. The application interfaces at each client device can receive and parse the transmitted data to render or update the presentation of the selections currently included in the shared network data record. The data processing system can monitor the timing or ordering of received selection updates by assigning sequence numbers or comparing timestamps to determine the most recent or valid update. In some implementations, the data processing system can process concurrent or conflicting selection updates by applying a conflict resolution policy, such as last-write-wins, participant priority, or administrator override, among others.

In some implementations, the data processing system can store a log of selection updates or synchronization messages to enable history replay or catchup for client devices that reconnect after a disconnect. The application interfaces can display visual indicators showing which selections have been confirmed and by which participants, and can differentiate between confirmed and unconfirmed selections using visual elements such as icons, color changes, or status banners, among others. The data processing system can update the application interfaces in real time or near real time to reflect the current state of the shared network data record. In some implementations, the data processing system can store a history of transmitted updates to enable catchup for client devices that reconnect after a transient disconnect. The data processing system can monitor for state changes in the shared network data record or for incoming requests from client devices that indicate a need to update the application interfaces.

The method 500, at ACT 510, can include receiving a lock message for the shared network data record. The data processing system can receive a lock message from a client device, where the message can indicate a participant's intent to lock a selection or to automatically execute a wager for the shared network data record. The lock message can include identifiers such as a selection identifier, participant identifier, or shared network data record identifier, among others. The data processing system can record the lock status in association with the relevant selection or shared network data record. In some implementations, the data processing system can monitor the lock status of all selections associated with a shared network data record and can determine when all required confirmations have been received.

In some implementations, the data processing system can process lock messages as triggers for subsequent execution steps, such as initiating execution or placement of the wager upon satisfaction of confirmation conditions or providing a prompt to the client device that transmitted the lock message to execute the wager. The data processing system can maintain state information in memory that links lock messages to specific participant identifiers and the shared network data record. The data processing system can generate notifications or interface updates for client devices based on changes to lock status, for example, by indicating lock status for individual selections or for whether a participant has confirmed or locked in a wager for a corresponding shared network data record. In some implementations, the data processing system can provide an indicator for presentation with the shared network data record via the application interface, and can receive a lock message in response to an interaction with the indicator.

The method 500, at ACT 512, can include determining that the client devices have provided confirmations for the first and second selections. The data processing system can monitor incoming communications from the client devices for confirmation messages, where each message can indicate that a participant has finalized or locked a selection for the shared network data record. The data processing system can parse each confirmation message to extract identifiers for the confirming client device, the relevant selection, and/or the shared network data record. The data processing system can update session state data (e.g., the lock settings 267) to record which selections have been confirmed and which remain pending for each participant. The data processing system can determine whether all required confirmations have been received by comparing the current confirmation status for each selection or participant against session requirements or configuration settings.

In some implementations, the data processing system can generate notifications or interface updates for the client devices to indicate which selections have been confirmed and by which participants. The application interfaces can display visual indicators showing confirmation status for each selection, and can provide notifications indicating that all selections have been confirmed. The data processing system can store confirmation status data in memory or persistent storage to facilitate subsequent processing, such as execution or settlement of the shared network data record. In some implementations, the data processing system can provide, to a client device that provided a lock message, a notification indicating that all selections of the shared network data record have been confirmed. The notification may include interactive elements or controls that allow the participant to review the confirmed selections and proceed with wager placement.

The method 500, at ACT 514, can include generating an association between the shared network data record and one or more network profiles according to the first data structure and the second data structure. The data processing system can generate a data object or record that encodes the current selections, participant attributions, and any relevant configuration parameters for the shared network data record. The data processing system can associate the generated shared network data record with player profiles or identifiers corresponding to the client devices that provided the selections. In some implementations, the data processing system can store the generated shared network data record in persistent storage or can transmit a confirmation message to the client devices indicating successful generation. The data processing system can monitor for subsequent modifications to the shared network data record, such as the addition or removal of selections, changes in participant membership, or updates to configuration settings.

In some implementations, the data processing system can generate notifications or interface updates for the client devices to reflect the current state of the shared network data record. The data processing system can store a history of state changes or associations between the shared network data record and participant profiles to enable auditability or recovery in the event of a failure. The data processing system can provide access controls or permission checks to restrict access to the shared network data record based on participant roles or session metadata. In some implementations, the data processing system can generate an association between the shared network data record and a network profile in response to a confirmation of a notification sent from a client device. The data processing system can generate a wager request payload that encodes the selections stored in the shared network data record, the corresponding data structures and parameters, and any participant-specific constraints or wager amounts. The data processing system can transmit the wager request payload to a wager backend system for processing, and can update the shared network data record to reflect the placement status for the corresponding network profile.

What is claimed is:

1. A system, comprising:

one or more processors coupled to non-transitory memory, the one or more processors configured to:

receive, from a first client device, a request to generate a shared network data record, the request identifying at least one identifier associated with a respective at least one second client device;

provide, for presentation at each of the first client device and the at least one second client device, a respective application interface for generation of the shared network data record;

receive, from the first client device, a selection of a data structure identified in a communication;

synchronize the selection of the data structure identified in the communication from the first client device between a first application interface presented at the first client device and a second application interface presented at the at least one second client device;

receive, from each of the first client device and the at least one second client device, a respective request indicating confirmation of at least one selection; and generate, responsive to receiving the respective request indicating confirmation from each of the first client device and the at least one second client device in accordance with a selection confirmation policy, the shared network data record according to the selection, the shared network data record associated with a first profile of the first client device and a second profile of the at least one second client device.

2. The system of claim 1, wherein the one or more processors are further configured to:

receive a configuration setting for the shared network data record in the request to generate the shared network data record; and determine that the selection satisfies at least one restriction identified in the configuration setting.

3. The system of claim 2, wherein the at least one restriction specifies a range of values for a parameter of the shared network data record.

4. The system of claim 2, wherein the configuration setting specifies at least one category for one or more data structures to be included in the shared network data record.

5. The system of claim 2, wherein the at least one restriction specifies a threshold number of data structures to be included in the shared network data record.

6. The system of claim 1, wherein the one or more processors are further configured to:

receive a first data record parameter for the shared network data record from the first client device;

receive a second data record parameter for the shared network data record from the second client device; and generate the shared network data record such that an association with the first profile identifies the first data record parameter and an association with the second profile identifies the second data record parameter.

7. The system of claim 1, wherein the one or more processors are further configured to:

cause presentation of the first application interface as an overlay for a graphical user interface of an application instance executing on the first client device and cause presentation of the second application interface as an overlay for the graphical user interface of an application instance executing on the second client device.

8. The system of claim 1, wherein the one or more processors are further configured to:

provide, in response to the request to generate the shared network data record, a notification to the second client device identifying the request to generate the shared network data record;

receive, from the second client device, a confirmation message to generate the shared network data record; and provide the respective application interface for generation of the shared network data record to the second client device in response to the confirmation message.

9. The system of claim 1, wherein the one or more processors are further configured to:

receive, from the first client device, a request to restrict the second client device from accessing the shared network data record; and update the shared network data record to remove a permission corresponding to the second client device.

10. The system of claim 1, wherein the one or more processors are further configured to cause presentation of a plurality of data structures selected for inclusion in the shared network data record via the first application interface presented at the first client device and the second application interface presented at the second client device.

11. A method, comprising:

receiving, by one or more processors coupled to non-transitory memory, from a first client device, a request to generate a shared network data record, the request identifying at least one identifier associated with a respective at least one second client device;

providing, by the one or more processors, for presentation at each of the first client device and the at least one second client device, a respective application interface for generation of the shared network data record;

receiving, by the one or more processors, from the first client device, a selection of a data structure identified in a communication;

synchronizing, by the one or more processors, the selection of the data structure identified in the communication from the first client device between a first application interface presented at the first client device and a second application interface presented at the at least one second client device;

receiving, by the one or more processors, from each of the first client device and the at least one second client device, a respective request indicating confirmation of at least one selection; and generating, by the one or more processors and responsive to receiving the respective request indicating confirmation from each of the first client device and the at least one second client device in accordance with a selection confirmation policy, the shared network data record according to the selection, the shared network data record associated with a first profile of the first client device and a second profile of the at least one second client device.

12. The method of claim 11, further comprising:

receiving, by the one or more processors, a configuration setting for the shared network data record in the request to generate the shared network data record; and determining, by the one or more processors, that the selection satisfies at least one restriction identified in the configuration setting.

13. The method of claim 12, wherein the at least one restriction specifies a range of values for a parameter of the shared network data record.

14. The method of claim 12, wherein the configuration setting specifies at least one category for one or more data structures to be included in the shared network data record.

15. The method of claim 12, wherein the at least one restriction specifies a threshold number of data structures to be included in the shared network data record.

16. The method of claim 11, further comprising:

receiving, by the one or more processors, a first data record parameter for the shared network data record from the first client device;

receiving, by the one or more processors, a second data record parameter for the shared network data record from the second client device; and generating, by the one or more processors, the shared network data record such that an association with the first profile identifies the first data record parameter and an association with the second profile identifies the second data record parameter.

17. The method of claim 11, further comprising:

causing, by the one or more processors, presentation of the first application interface as an overlay for a graphical user interface of an application instance executing on the first client device and causing, by the one or more processors, presentation of the second application interface as an overlay for the graphical user interface of an application instance executing on the second client device.

18. The method of claim 11, further comprising:

providing, by the one or more processors and in response to the request to generate the shared network data record, a notification to the second client device identifying the request to generate the shared network data record;

receiving, by the one or more processors, from the second client device, a confirmation message to generate the shared network data record; and providing, by the one or more processors, the respective application interface for generation of the shared network data record to the second client device in response to the confirmation message.

19. The method of claim 11, further comprising:

receiving, by the one or more processors, from the first client device, a request to restrict the second client device from accessing the shared network data record; and updating, by the one or more processors, the shared network data record to remove a permission corresponding to the second client device.

20. The method of claim 11, further comprising causing, by the one or more processors, presentation of a plurality of data structures selected for inclusion in the shared network data record via the first application interface presented at the first client device and the second application interface presented at the second client device.

* * * * *